(12) United States Patent
Zappia

(10) Patent No.: US 7,634,114 B2
(45) Date of Patent: Dec. 15, 2009

(54) METHOD AND APPARATUS FOR IRIS BIOMETRIC SYSTEMS FOR USE IN AN ENTRYWAY

(75) Inventor: Thomas M. Zappia, Somerville, MA (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 11/849,969

(22) Filed: Sep. 4, 2007

(65) Prior Publication Data

US 2008/0181467 A1 Jul. 31, 2008

Related U.S. Application Data

(60) Provisional application No. 60/841,768, filed on Sep. 1, 2006.

(51) Int. Cl.
*G06K 9/00* (2006.01)
(52) U.S. Cl. .................................. 382/117; 382/115
(58) Field of Classification Search ................. 382/117, 382/115
See application file for complete search history.

(56) References Cited

U.S. PATENT DOCUMENTS

| | | | |
|---|---|---|---|
| 5,481,622 A | 1/1996 | Gerhardt et al. | |
| 6,320,610 B1 | 11/2001 | Van sant et al. | |
| 6,424,727 B1 | 7/2002 | Musgrave et al. | |
| 7,095,901 B2 | 8/2006 | Lee et al. | |
| 7,428,320 B2 * | 9/2008 | Northcott et al. | ............ 382/117 |
| 2006/0150928 A1 | 7/2006 | Lehmann et al. | |
| 2006/0274918 A1 * | 12/2006 | Amantea et al. | ............ 382/117 |

FOREIGN PATENT DOCUMENTS

| | | |
|---|---|---|
| EP | 1324259 | 7/2003 |
| WO | WO 97/21188 | 6/1997 |
| WO | WO 98/08439 | 3/1998 |
| WO | WO 00/39760 | 7/2000 |

* cited by examiner

*Primary Examiner*—Wesley Tucker
(74) *Attorney, Agent, or Firm*—Lowenstein Sandler PC

(57) ABSTRACT

A method and apparatus for designing an iris biometrics system that operates in minimally constrained settings. The image acquisition system has fewer constraints on subjects than traditional methods by extending standoff distance and capture volume. The method receives design parameters and provides derived quantities that are useful in designing an image acquisition system having a specific set of performance requirements. Exemplary scenarios of minimally constrained settings are provided, such as a high volume security checkpoint, an office, an aircraft boarding bridge, a wide corridor, and an automobile.

13 Claims, 20 Drawing Sheets

◇ APHAKIC HAZARD FUNCTION
□ BLUE LIGHT HAZARD FUNCTION
△ RETINAL THERMAL HAZARD FUNCTION

FIG. 9

| FIG. 9A |
|---|
| FIG. 9B |
| FIG. 9C |
| FIG. 9D |
| FIG. 9E |

| | A | B | C | D | E | F | G | H |
|---|---|---|---|---|---|---|---|---|
| 1 | System Component | Parameter | Value | Units | Symbol | Value (SI) | SI Units | Formula |
| 2 | Illumination | | | | | | | |
| 3 | | Wavelength | 850 | nm | $\lambda_{source}$ | 8.500E-07 | m | =C3*MeterToNm |
| 4 | | Radiance | 2.3 | W/cm²·sr | $L_{source}$ | 2.300E+04 | W/m²·sr | =C4*MeterToCm^2 |
| 5 | | Radiance TLV | 774.7 | W/cm²·sr | | 7.747E+06 | W/m²·sr | =OcularRadianceTLV/(SourceDuration, SourceWavelength*1000000000, angularSubtense ) |
| 6 | | Area of single emitter | 0.012 | cm² | $A_{source}$ | 1.194E-06 | m² | =C6*MeterToCm^2 |
| 7 | | Number of Emitters | 240 | | | 2.400E+02 | | =C7 |
| 8 | | Radiant Intensity | 6.59 | W/sr | $I_{source}$ | 6.590E+00 | W/sr | =SourceRadiance*SourceArea*NumberEmitters |
| 9 | | Total optical power | 41 | W | | 4.141E+01 | W | =2*PI*RadiantIntensity |
| 10 | | Duty cycle | 10% | % | | 1.000E-01 | % | =C10 |
| 11 | | Pulse width | 3.333 | msec | | 3.333E-03 | sec | =SourceDutyCycle/SourceRepetitionRate |
| 12 | | Repetition rate | 30 | Hz | | 3.000E+01 | Hz | =C12 |
| 13 | | Duration | 10 | sec | | 1.000E+01 | sec | =C13 |
| 14 | | | | | | | | |
| 15 | | | | | | | | |
| 16 | Illumination Standoff | | | | | | | |
| 17 | | Distance | 1.0 | m | $d_{illumination}$ | 1.000E+00 | m | =C17 |
| 18 | | Distance/size ratio (must be > 10) | 915 | | | 9.152E+02 | | =IlluminationDistance/SQRT(SourceArea) |
| 19 | | Angular subtense (square source) | 0.0015 | radians | | 1.545E-03 | radians | =SQRT(2)*SQRT(SourceArea)/IlluminationDistance |
| 20 | | Optical properties | | | | | | |
| 21 | | | | | | | | |

*FIG. 9A*

|    | A | B | C | D | E | F | G | H |
|----|---|---|---|---|---|---|---|---|
| 22 | Ambient Illumination | | | | | | | |
| 23 | | Wavelength | 850 | nm | $\lambda_{ambient}$ | 8.500E-07 | m | =C23*0.000000001 |
| 24 | | Subject irradiance | 0.2 | W/cm² | $E_{ambient}$ | 2.000E+03 | W/m² | =10000*C24 |
| 25 | | | | | | | | |
| 26 | Subject | | | | | | | |
| 27 | | Subject irradiance | 0.659 | mW/cm² | $E_{subject}$ | 6.590E+00 | W/m² | =RadiantIntensity/(IlluminationDistance^2) |
| 28 | | Irradiance TLV - non-laser | 320.1 | mW/cm² | | 3.201E+03 | W/m² | =OcularIrradianceTLV/(SourceDuration,SourceWavelength)*(1000000000) |
| 29 | | Irradiance TLV - laser | 2.0 | mW/cm² | | 2.020E+01 | W/m² | =laserOccularIrradianceTLV/(SourceDuration,SourceWavelength)*(1000000000) |
| 30 | | Iris albedo | 0.19 | | | 1.900E-01 | | =C30 |
| 31 | | Iris albedo RMS variation | 18% | % | | 18% | % | =C31 |
| 32 | | Skin albedo | 0.58 | | | 5.800E-01 | | =C32 |
| 33 | | Sclera albedo | 0.37 | | | 3.700E-01 | | =C33 |
| 34 | | Pupil albedo | 0.05 | | | 5.000E-02 | | =C34 |
| 35 | | Iris diameter | 1.0 | cm | | 1.000E-02 | m | =C35/MeterToCm |
| 36 | | Iris average excitance | 0.125 | mW/cm² | | 1.252E+00 | W/m² | =SubjectIrradiance*IrisAlbedo |
| 37 | | Iris RMS excitance | 0.023 | mW/cm² | | 2.254E-01 | W/m² | =IrisAverageExitance*IrisAlbedoVariation |
| 38 | | | | | | | | |
| 39 | | | | | | | | |
| 40 | Camera Standoff | | | | | | | |
| 41 | | Distance | 2.0 | m | $d_{camera}$ | 2.000E+00 | m | =C40 |
| 42 | | Optical properties | | | | | | |

FIG. 9B

| | A | B | C | D | E | F | G | H |
|---|---|---|---|---|---|---|---|---|
| | System Component | Parameter | Value | Units | Symbol | Value (SI) | SI Units | Formula |
| 43 | Camera Lens | | | | | | | |
| 44 | | Magnification | 0.1184 | | | 1.184E-01 | | =PixelPitchHorizontal*IrisImageResolution |
| 45 | | Focal length | 212 | mm | $f$ | 2.117E-01 | m | =(CameraLensMagnification*CameraStandoffDistance)/(CameraLensMagnification+1) |
| 46 | | F# | 5.6 | | $F\#$ | 5.6 | | =C46 |
| 47 | | Transmission | 100% | % | $T_{lens}$ | 100% | % | =C47 |
| 48 | | Effective Lens Diameter | 37.8 | mm | | 3.781E-02 | m | =FocalLength/FNumber |
| 49 | | Lens Capture Efficiency | 0.00447% | | | 4.467E-05 | | =(1/8)*(EffectiveLensDiameter/CameraStandoffDistance)^2 |
| 50 | | Total Lens Efficiency | 0.00447% | | | 4.467E-05 | | =LensCaptureEfficiency*LensTransmission |
| 51 | | Circle of confusion (at sensor) | 65.8 | microns | | 6.578E-05 | m | =PixelPitchHorizontal*ExcessResolutionFactor |
| 52 | | Hyper focal distance | 121.9 | m | | 1.219E+02 | m | =FocalLength+(FocalLength^2)/(FNumber*CircleOfConfusion)) |
| 53 | | Near focus limit | 1.971 | m | | 1.971E+00 | m | =CameraStandoffDistance*(HyperFocalDistance-FocalLength)/(HyperFocalDistance+CameraStandoffDistance-2*FocalLength) |
| 54 | | Far focus limit | 2.030 | m | | 2.030E+00 | m | =CameraStandoffDistance*(HyperFocalDistance-FocalLength)/(HyperFocalDistance-CameraStandoffDistance) |
| 55 | | Depth of field | 5.9 | cm | | 5.879E-02 | m | =FarFocusLimit-NearFocusLimit |

| | A | B | C | D | E | F | G | H |
|---|---|---|---|---|---|---|---|---|
| | System Component | Parameter | Value | Units | Symbol | Value (SI) | SI Units | Formula |
| 57 | Camera Sensor | | | | | | | |
| 58 | | Quantum Efficiency (interacting/incident photons) | 6% | % | QE | 6.0% | | =C58 |
| 59 | | Camera Gain J (interacting photon) | 14 | photon/DN | | 14 | photon/DN | =C59 |
| 60 | | Camera Gain K (electron) | 14 | e-/DN | | 14 | e-/DN | =C60 |
| 61 | | Well depth | 1000 e- | | | 1.000E+04 e- | | =C61 |
| 62 | | Read Noise | 0.0 e- | | | 0.000E+00 e- | | =C62 |
| 63 | | Shot Noise | 3.6 e- | | | 3.620E+00 e- | | =SQRT(SensorAverageSignal) |
| 64 | | | | | | | | |
| 65 | | Pixel width | 7.4 | micron | | 7.400E-06 | m | =SQRT(SensorFillFactor)*PixelPitchHorizontal |
| 66 | | Pixel height | 7.4 | micron | | 7.400E-06 | m | =PixelWidth |
| 67 | | Pixel pitch horizontal | 7.4 | micron | | 7.400E-06 | m | =C67/MeterToMicron |
| 68 | | Pixel pitch vertical | 7.4 | micron | | 7.400E-06 | m | =PixelPitchHorizontal |
| 69 | | Pixel Area | 54.76 | micron² | | 5.476E-11 | m² | =PixelWidth*PixelHeight |
| 70 | | Fill factor | 100% | | | 100% | % | =C70 |
| 71 | | SensorWidthPixels | 2048 | | | 2048 | | |
| 72 | | SensorHeightPixels | 2048 | | | 2048 | | |
| 73 | | SensorWidth | 1.516 | | | 0.01516 | | |
| 74 | | SensorHeight | 1.516 | | | 0.01516 | | |
| 75 | | | | | | | | |
| 76 | | Shutter time | 60 | 1/sec | | 1.667E-02 | sec | =1/C76 |
| 77 | | | | | | | | |
| 78 | | Photon Energy | 1.46 | eV | | 2.337E-19 | joule | =Planck_s_Constant*Speed_of_Light/SourceWavelength |
| 79 | | Sensor average irradiance | 5.5E-09 | W/cm² | | 5.594E-05 | W/m² | =IrisAverageExitance*TotalLensEfficiency |
| 80 | | Sensor RMS Irradiance | 1.0E-09 | W/cm² | | 1.007E-05 | W/m² | =IrisRMSExitance*TotalLensEfficiency |
| 81 | | Sensor Signal Photons | 218.4 | photons | | 218.4 | photons | =SensorAverageIrradiance*PixelArea*CameraShutter/PhotonEnergy |
| 82 | | Sensor Average Signal | 13.1 e- | | | 13.1 e- | | =QuantumEfficiency*SensorSignalPhotons |
| 83 | | Sensor RMS Signal | 2.4 e- | | | 2.4 e- | | =SensorAverageSignal*IrisAlbedoVariation |
| 84 | | TotalSensorNoise | 3.6 e- | | | 3.6 e- | | =ReadNoise+ShotNoise |
| 85 | | Dynamic Range Fraction | 0.13% | | | 0.13% | | =SensorAverageSignal/WellDepth |
| 86 | | Signal/Noise | 11.2 dB | | | 11.17 dB | | =20*LOG(SensorAverageSignal/TotalSensorNoise) |
| 87 | | Contrast Signal/Noise | -3.7 dB | | | -3.72 dB | | =20*LOG(SensorRMSSignal/TotalSensorNoise) |

| | A | B | C | D | E | F | G | H |
|---|---|---|---|---|---|---|---|---|
| | System Component | Parameter | Value | Units | Symbol | Value (SI) | SI Units | Formula |
| 89 | Iris Image | | | | | | | |
| 90 | | Pixels across iris | 160 | | | 160 | | =C90 |
| 91 | | Resolution (at subject) | 160.0 | pixels/cm | | 1.600E+04 | pixels/m | =PixelsAcrossIris/IrisDiameter |
| 92 | | Excess Resolution Factor | 889% | | | 889% | | =IrisImageResolution/MinimumRequiredResolution |
| | | Minimum Required Resolution (at subject) | 18 | pixels/cm | | 1.800E+03 | pixels/m | =C93*MeterToCm |
| 93 | | Iris average pixel value | 0.9 | | | 9.362E-01 | | =SensorAverageSignal/CameraGainK |
| 94 | | Iris RMS variation pixel value | 0.2 | | | 1.685E-01 | | =SensorRMSSignal/CameraGainK |
| 95 | | Sclera average pixel value | 1.8 | | | 1.823E+00 | | =IrisAveragePixelValue*ScleraAlbedo/IrisAlbedo |
| 96 | | Pupil average pixel value | 0.2 | | | 0.24636617 | | =IrisAveragePixelValue*F34/IrisAlbedo |
| 97 | | | | | | | | |
| 98 | | | | | | | | |
| 99 | Constants | | | | | | | |
| 100 | | MeterToCm | 1.E+02 | | | | | |
| 101 | | MeterToMicron | 1.E+06 | | | | | |
| 102 | | MeterToMm | 1.E+03 | | | | | |
| 103 | | MeterToNm | 1.E+09 | | | | | |
| 104 | | SecToMSec | 1.E+03 | | | | | |
| 105 | | WattToMW | 1.E+03 | | | | | |
| 106 | | FaradToF | 1.E+15 | | | | | |
| 107 | | VoltTouV | 1.E+06 | | | | | |
| 108 | | AmpereTonA | 1.E+09 | | | | | |
| 109 | | Pi | 3.14159 | | | | | |
| 110 | | Planck's Constant | 6.63E-34 | | | | | |
| 111 | | Speed of Light | 3.00E+08 | m/s | | | | |
| 112 | | eV to Joule | 1.60E-19 | coul/e- | | | | |

FIG. 9E

METHOD AND APPARATUS FOR IRIS BIOMETRIC SYSTEMS FOR USE IN AN ENTRYWAY

CROSS-REFERENCE TO RELATED APPLICATIONS

This application claims the benefit of U.S. Provisional Patent Application No. 60/841,768, filed Sep. 1, 2006. This application also claims priority to U.S. patent application Ser. No. 11/364,300, filed on Feb. 28, 2006, currently pending, which claims the benefit of U.S. Provisional Application No. 60/687,106 filed on Jun. 3, 2005. In addition, this application claims priority to U.S. patent application Ser. No. 11/334,968, filed on Jan. 19, 2006, now U.S. Pat. No. 7,542,628. The contents of all of the above-listed applications are hereby incorporated by reference herein.

GOVERNMENT RIGHTS IN THIS INVENTION

This invention was made with U.S. government support under contract number NMA401-02-9-2001-0041. The U.S. government has certain rights in this invention.

BACKGROUND OF THE INVENTION

1. Field of the Invention

The invention relates generally to biometric techniques. More specifically, the invention relates to iris-based biometric techniques.

2. Description of the Related Art

Iris based biometric techniques are useful for recognition, verification, or tracking of individuals. Iris based biometric methods can provide high accuracy identification and other functions with relatively low system cost. Because of the availability of very efficient indexing techniques, iris-based biometrics can also be used when a large number of people must be screened and rapidly matched to a database of millions of individuals.

However, the widespread use of iris-based biometrics has been limited by the conditions imposed by the requirement that high resolution, high contrast images of the iris be obtained. This requirement was only met reliably by the careful positioning of a single, cooperative, stationary subject within the limited field of view of a suitable illumination and image capture device. Typical existing systems limit this capture volume to a small region of space within a few 10's of centimeters of the sensor. For example, the LG3000 system manufactured by LG Electronics requires a subject to remain stationary for 3-10 seconds at standoff distance of roughly 10 cm and provides a capture volume of roughly 10×2×2 cm or 0.04 liters. These limitations are workable in constrained settings such as security checkpoints, bank teller machines, or information system access points, but severely limit the applicability of iris biometrics in minimally constrained settings, such as screening in airports, subway systems, or at entrances to otherwise uncontrolled buildings or facilities.

In designing a practical iris-based biometric system having a large standoff distance, many variables must be addressed including the standoff distance for both the camera and illumination source, the iris illumination power (pulsed and continuous), the lens focal length, the capture volume, and so on. To design a system to fulfill specific design parameters for a given minimally constrained environment for the system, extensive trial and error "tuning" is required. Such trial and error tuning is time consuming and costly.

Therefore, there is a need in the art for a method and apparatus for designing iris-based biometric systems for use in minimally constrained settings.

SUMMARY OF THE DISCLOSURE

The deficiencies of the prior art are addressed by various exemplary embodiments of the present invention of a method and apparatus for designing iris biometric systems for use in minimally constrained settings. Design constraints for a minimally constrained setting and input parameter values are received. Using the input parameters and constraints, parameter(s) are calculated to produce a design for an iris biometrics system using synchronized stroboscopic illumination that operates within the design parameters. The ultimate design is safe to a subject's eye yet provides sufficient illumination to enable iris recognition over long distances.

BRIEF DESCRIPTION OF THE DRAWINGS

The teachings of the present invention can be readily understood by considering the following detailed description in conjunction with the accompanying drawings, in which:

FIG. 9, which includes FIGS. 9A, 9B, 9C, 9D, and 9E, is a table of an exemplary parametric model of an iris recognition system.

To facilitate understanding, identical reference numerals have been used, where possible, to designate identical elements that are common to the figures.

DETAILED DESCRIPTION

The invention will be primarily described within the general context of exemplary embodiment of the present invention of a method and apparatus for defining an iris biometrics system for operation in minimally constrained settings.

The present invention defines systems having fewer constraints on subjects than traditional methods by extending standoff distance and capture volume. The standoff distance is the distance between the image acquisition system and the subject. In some cases, there may be two standoff distances, the camera-subject distance and illumination-subject distance. The capture volume is a volume in four dimensions (i.e., space and time) within which an iris image can be captured with high probability that it will generate an acceptable iris template.

An input to the system comprises a definition of the environment in which iris biometrics are to be captured. The invention processes these environmental constraints to derive the parameters of an iris biometric system that enables iris imaging using large standoff distances and optimal, safe iris illumination.

Exemplary embodiments of systems designed using the present invention may be used in many different scenarios, including the following exemplary scenarios: (1) a high volume security checkpoint, (2) an office, (3) an aircraft boarding bridge, (4) a wide corridor, and (5) an automobile. In a high volume security checkpoint, subjects must be imaged without stopping or actively cooperating in the identification method. In an office, multiple subjects must be imaged while moving through a large volume, changing direction orientation. In an aircraft boarding bridge, which is loading or unloading, subjects must be imaged with only the constraints on position and speed of motion imposed by the width of the space. In a wide corridor, subjects may move in different directions or change direction and the capture volume must be large enough that all persons passing through the corridor are imaged successfully. In an automobile, subjects must be imaged at a range of distances from an outside camera and illuminator.

These scenarios differ in the degree of constraint. For example, the corridor is less constrained than the other boarding bridge and, hence, likely to have a lower acquisition rate. Also, the automobile has the difficulty of a glass partition in front of the subject. Consequently, exemplary embodiments of the present invention include a method for designing systems to meet various combinations and degrees of constraint, such as a system for a particular scenario.

Figure 1:
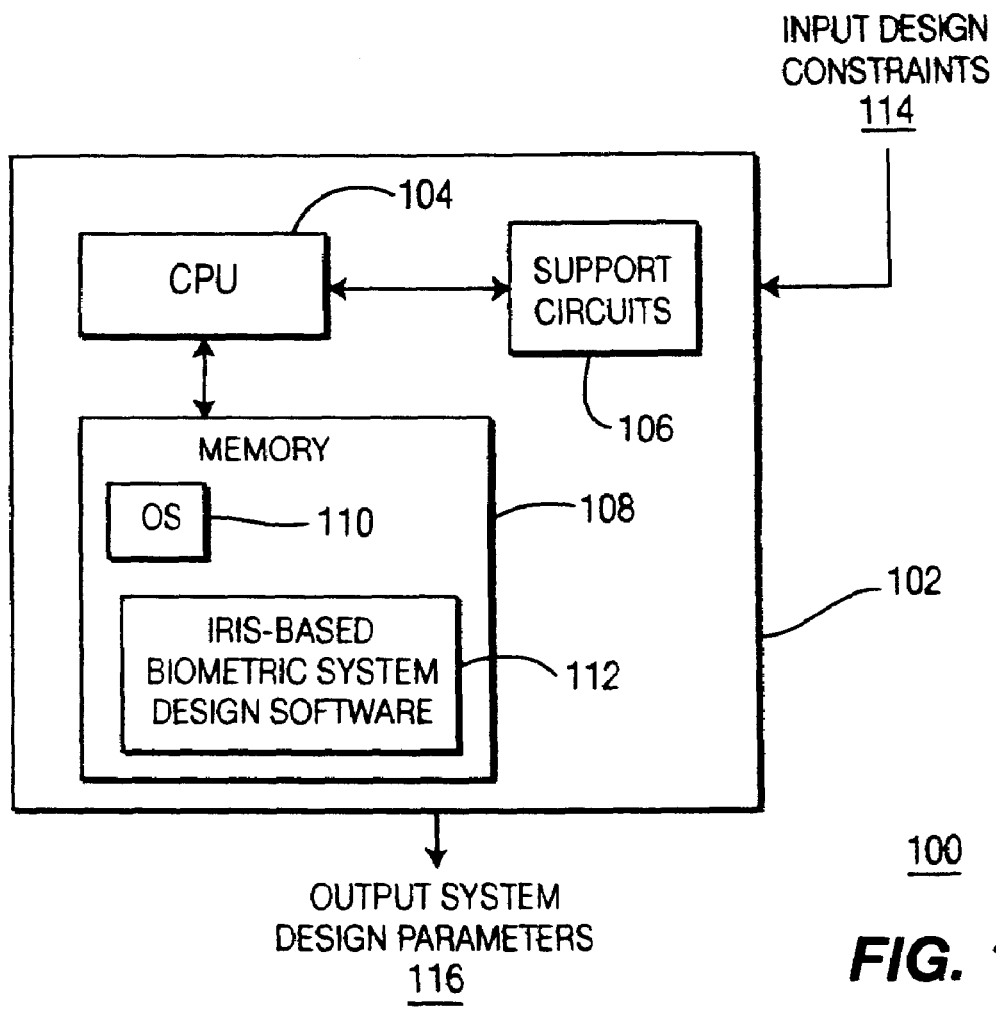
FIG. 1 depicts a computer system that executes iris-based biometric system design software of the present invention.

FIG. 1 depicts an exemplary system used to implement the present invention. The system 100 comprises a general purpose computer 102 that, when executing certain software, becomes a specific purpose computer that performs the present invention. The computer 102 comprises at least one central processing unit (CPU) 104, support circuits 106, and memory 108. The CPU 104 may be any one of the many microprocessors that are commercially available. The support circuits 106 comprise circuits that facilitate operation of the CPU 104 including clock circuits, cache, power supplies, input/output circuits and the like. The memory 108 may comprise one or more of read only memory, random access memory, disk drives, optical memory, removable memory and the like. The memory 108 stores an operating system 110 and iris-based biometric system design software 112. When the software 112 is executed, the computer processes input information 114 to define an optimal biometric system 116 that fulfills the given design constraints. As such, the system 100 processes input design constraints 114 to produce output system design parameters 116.

Figure 2:
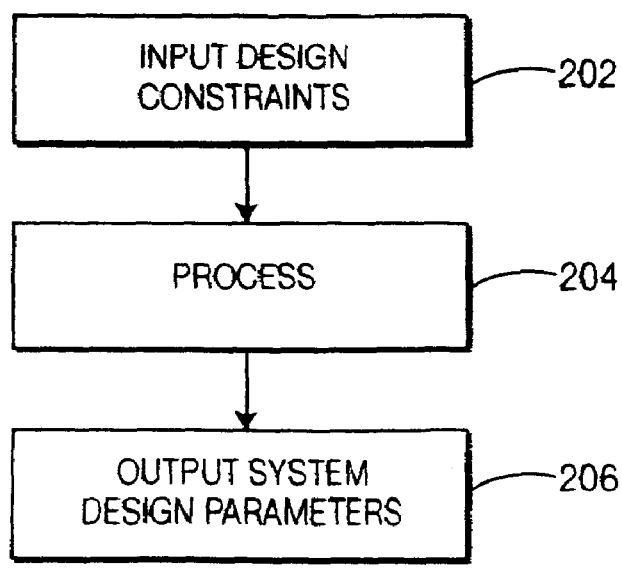
FIG. 2 depicts a flow diagram of a method of the present invention.

FIG. 2 depicts a flow diagram of the method 200 performed by the computer when executing the software 112. At step 202, the method 200 receives input constraints that define the environment in which the iris biometrics are to be captured. These constraints are generally entered into a table or spread sheet that defines the scenario. At step 204, these constraints are processed as described below to generate, at step 206, a set of parameters that define an iris-based biometric system that will operate in the given environment.

Figure 3:
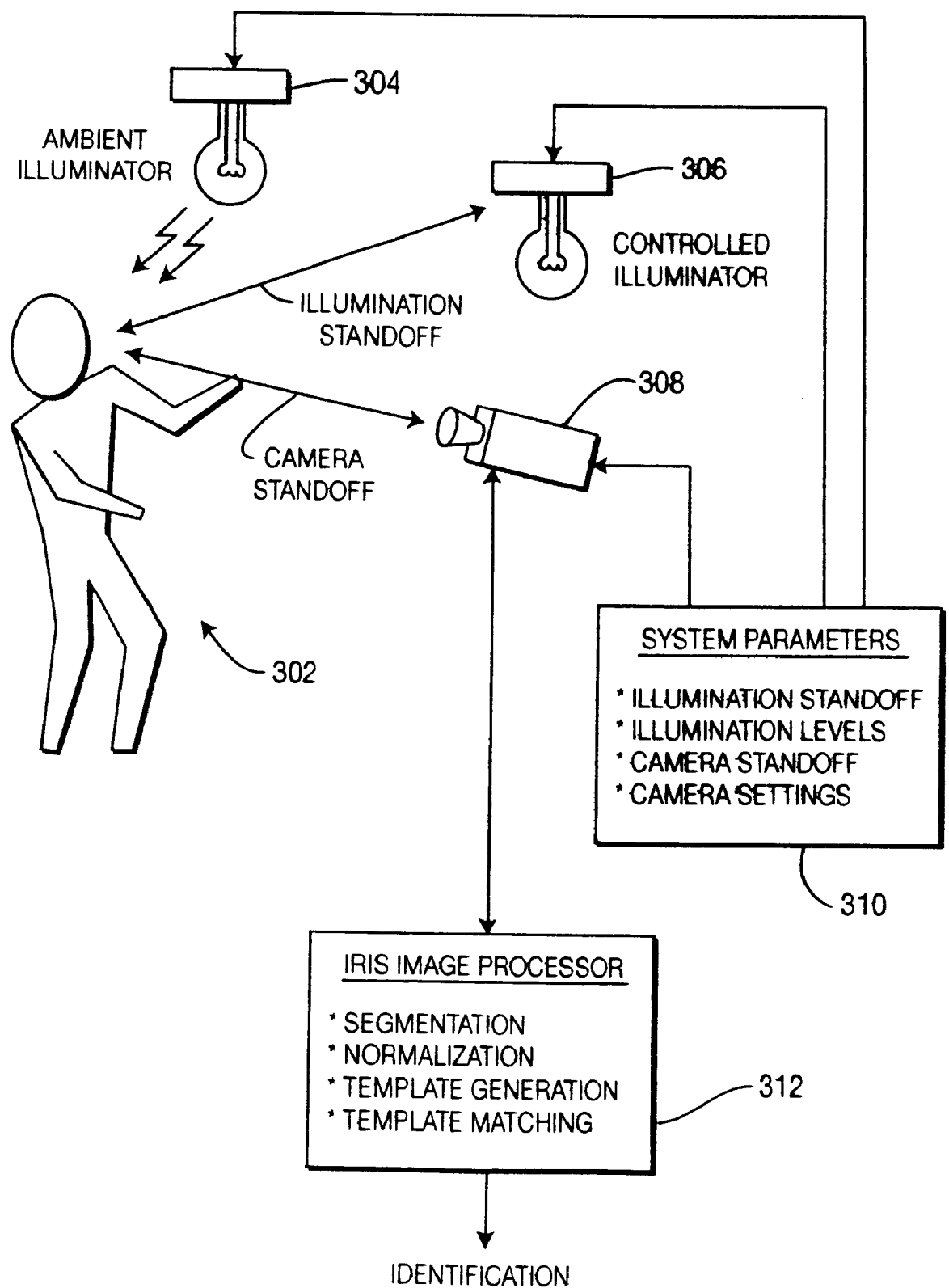
FIG. 3 depicts a block diagram of an iris-based biometric system having parameters that are designed by the present invention.

FIG. 3 depicts a block diagram of an iris biometrics system 300 that is designed using the present invention. The system 300 comprises an ambient illuminator 304, a controlled illuminator 306, a camera 308, and an iris image processor 312. The present invention generates the system parameter 310 including, but not limited to, an illumination standoff (the distance from the controlled illuminator to a subject 302), an illumination level, the camera standoff (a distance from the camera to the subject 302), and the camera settings (position, focal length, and the like). The scenario represents a multidimensional problem that includes numerous variable parameters.

The subject is illuminated by both ambient illumination and controlled illumination. Both illuminators 304 and 306 may be controlled, or only the controlled illuminator 306 may be controlled. The illumination levels received at the subject 302 from all sources of illumination must meet specific safety levels to avoid damage to the retina of the subject, yet provide sufficient illumination for the iris image to be processed. Thus, a safety assessment is performed that accounts for scenario constraints (e.g., camera and illuminator position), standoff distances, ambient illumination, maximum level of illumination from the controlled illuminator and so on.

Once illuminated, the camera 308 captures one or more images of the subject's iris, the processor 312 segments and normalizes the images. Then, an iris template is created, which is matched to a database of templates to identify the subject.

In an office scenario, there are many possibilities for designing a biometric system. The subjects may be seated in chairs and all looking in the same direction, towards a desk of the occupant of the office, or they may be in various places around the room. Subjects may be entering or leaving the room and may be looking in any direction. For seated, non-moving subjects, the camera (or cameras) can be positioned on the desk or behind the person sitting at the desk. For moving subjects, the cameras may need to be positioned around the room, because, in effect, the entire room is the capture volume. There are different challenges for moving and non-moving subjects. In the case of non-moving subjects seated in front of the desk, one challenge is simply to find the subjects' eyes and irises and to associate the identification with a particular person. In most cases, the subjects are not concealing their irises, although the person behind a desk could ask them, for example, to remove sunglasses. With no movement or occlusion, exemplary embodiments of the present invention are able to capture essentially all the irises. For moving subjects, the challenge is harder. Subjects may be facing in any direction, may be moving, and may be entering and leaving the capture volume at any time. Additionally, their irises may be found at varying heights, depending on whether they are standing, seated, or in the act of sitting down or getting up. On the other hand, it can be anticipated that subjects will not be moving particularly fast—differentiating the office scenario from, for example, the airport scenario where subjects are in a hurry.

Table 1 shows design constraints for an exemplary office scenario. These constraints include specific values for the capture volume, the standoff distance, a number of persons in the capture volume that a biometric system is able to handle at one time, the acquisition rate, the speed at which the persons are moving, the cooperation of the subjects, and whether the exemplary embodiment of the present invention includes features for an attendant. In one exemplary embodiment of the present invention, these specific values and others are input to the method 200 for designing iris biometric systems in minimally constrained settings and the configuration for a particular iris biometric system is provided that operates within the input constraints for the office scenario.

TABLE 1

Exemplary Constraints for an Office Scenario

| | |
|---|---|
| Capture Volume | 3 m × 3 m × 2.5 m |
| Standoff Distance | ≦3 m |
| Number of subjects in capture volume | ≦6 |
| Acquisition rate | Seated 100%/Moving 75% |
| Speed of subjects | ≦1 m/s |
| Cooperation | Little or none |
| Attended/Unattended | Optional |

In a boarding bridge scenario, passengers may be boarding or exiting an airplane through a boarding bridge. Typically, the space through which passengers pass is approximately 1.5 m wide and 2.1 m high. The depth of the capture volume is approximately 1 m. Most people in the capture volume are moving and facing in the same direction, but that direction changes depending on whether the people are boarding or exiting. People may be moving side-by-side and occluding persons behind them. One challenge is to find the eyes in the volume, capture the irises, and associate identification with a particular person. Persons on the bridge are rarely more than two abreast and are frequently single file. However, occlusion, which occurs when one person is directly between the camera and another person, is expected to occur occasionally. It is also expected that individuals may deliberately or inadvertently block their irises from the view of the camera, e.g., with near infrared (NIR) opaque glasses or contact lenses. Upon identification, a person for whom a good iris image has not been acquired may need to be taken aside for further screening. It may be desirable to screen for aberrant behavior, e.g., a person moving opposite to the general traffic flow. Upon detection, a person, who is, for example, attempting to board when passengers were exiting, may be checked against a list of authorized personnel.

Table 2 shows specific values of constraints for an exemplary boarding bridge scenario. In one exemplary embodiment of the present invention, these specific values and others are input to the method 200 for designing iris biometric systems in minimally constrained settings and the configuration for a particular iris biometric system is provided that operates within the input constraints for the boarding bridge scenario.

TABLE 2

Exemplary constraints for a Boarding Bridge Scenario

| | |
|---|---|
| Capture volume | 1.5 m × 1 m × 1 m |
| Standoff Distance | 3 m-10 m |
| Number of subjects in capture volume | ≦3 |
| Acquisition rate | 80% |
| Speed of subjects | ≦2 m/sec. |
| Cooperation | When asked |
| Attended/Unattended | Attended |

While similar to the boarding bridge scenario, the capture volume of a corridor scenario may be larger and people may be moving in both directions at all times. For full coverage, therefore, it is desirable to have cameras pointing in both directions and across the corridor. It is expected that at times there may be many persons in the capture volume and that there may be multiple occlusions. One challenge is to capture as many iris images as possible, given the uncontrolled nature of the environment. Usually it is difficult to ask persons to undergo secondary screening, because this scenario is usually an uncontrolled passageway without specific security measures associated with it. It may be desirable to identify as many persons as possible in a database (possibly a watch list), given that some percentage of irises will not be captured.

Table 3 shows specific values of constraints for an exemplary corridor scenario. In one exemplary embodiment of the present invention, these specific values and others are input to the method 200 for designing iris biometric systems in minimally constrained settings and the configuration for a particular iris biometric system is provided that operates within the input constraints for the corridor scenario.

TABLE 3

Exemplary Constraints for a Corridor Scenario

| | |
|---|---|
| Capture Volume | 3 m × 1 m × 1 m |
| Standoff Distance | ≦3 m |
| Number of subjects in capture volume | ≦10 |
| Acquisition rate | 75% |
| Speed of subjects | ≦2 m/sec. |
| Cooperation | None |
| Attended/Unattended | Unattended |

In an automobile scenario, the irises of the driver of a moving automobile are to be captured. Unlike the other scenarios where multiple people are in the capture volume, in the automobile scenarios, the subject is the single person seated in the front seat on the driver's side. In the automobile scenarios, the automobile is not moving very rapidly, e.g., it has slowed down for a barrier or a tollbooth or a drive-by window, such as an automated teller machine (ATM) or a food service window. One challenge is to find the iris and capture it through a glass partition, which may be either the front windshield or the side window. The window may have a large degree of unpredictable specularity and may be tinted so that image brightness is attenuated. Getting sufficient light on the subject under these circumstances might prove difficult. The transparency of different varieties of autoglass in the near infrared under various conditions may be determined. Sometimes it is desirable to immediately identify the driver of a car when the subject is in the database. This is useful for installations such as drive-through ATMs and tollbooths, security barriers, and border crossings. In the automobile scenario, failure to capture results in additional screening, much like a portal (constrained capture) scenario. For example, at a tollbooth, if capture through the windshield fails, the driver is required to stop, open the driver-side window, and peer at a device until recognized.

Table 4 shows specific values of constraints for an exemplary automobile scenario. In one exemplary embodiment of the present invention, these specific values and others are input to the method 200 for designing iris biometric systems in minimally constrained settings and the configuration for a particular iris biometric system is provided that operates within the input constraints for the automobile scenario. Of course, other constraints and other specific values for these and other scenarios are within the scope of the present invention.

TABLE 4

Exemplary Parameters for an Automobile Scenario

| | |
|---|---|
| Capture Volume | 0.5 m × 0.5 m × 0.5 m |
| Standoff Distance | 3 m-10 m |
| Number of subjects in capture volume | 1 |
| Acquisition rate | 75% |
| Speed of subjects | ≦1 m/sec. |
| Cooperation | None |
| Attended/Unattended | Optional |

There are various outcomes for attempting to perform iris recognition. For example, the system may fail to recognize that a subject is within the capture volume, fail to acquire an iris template from a subject known to be within the capture volume, fail to recognize an acquired iris template, match an iris template against a watchlist, match an iris template against some other database (e.g., authorized users, passenger manifest, employee database), recognize some feature of an acquired template or iris image that triggers an alarm (e.g., an attempt to spoof the system, or a subject moving counter to expected flow for that type of subject, or a false match against a database. Exemplary embodiments of systems for performing iris recognition can be designed to respond differently to the outcome depending on the particular scenario and the needs and desires of the client. Some exemplary responses to failure to acquire an iris template from someone known to be in the capture volume include sounding an alarm, signaling a person, and collecting the failure as a statistic to measure system performance.

Figure 4:
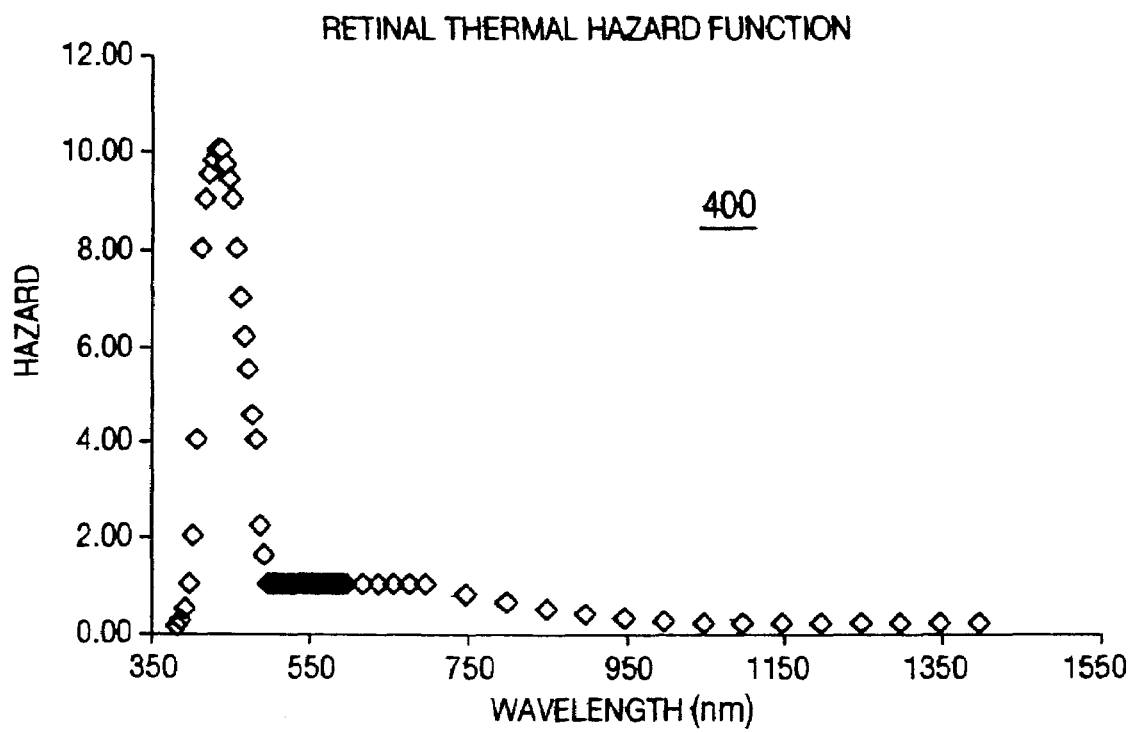
FIG. 4 is a graph of an exemplary retinal thermal hazard function.
Figure 5:
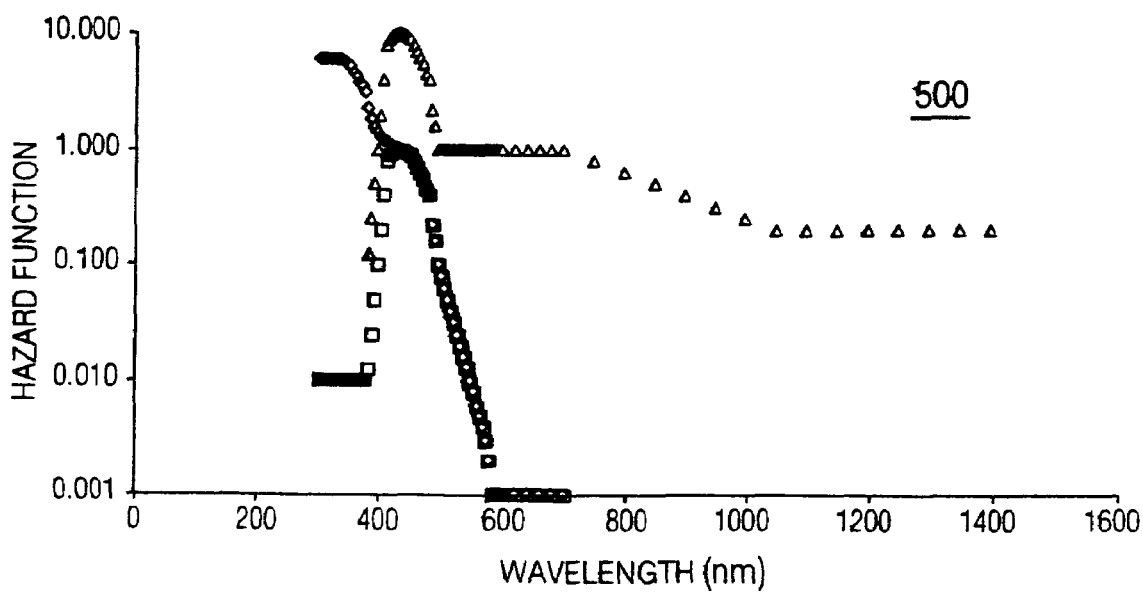
FIG. 5 is a graph of an exemplary hazard function.

When designing an iris biometrics system, the method 200 must account for the possible retinal damage that could occur in any environment. FIGS. 4 and 5 are charts of exemplary hazard functions 400 and 500. These charts illustrate the relative hazard of thermal damage to the retina from visible or infra-red light as a function of the wavelength of that light. A hazard function according to these charts is used in an exemplary embodiment of the present invention of an iris acquisition model (see FIGS. 9A-E) to determine eye-safe levels of absorption.

Figure 7:
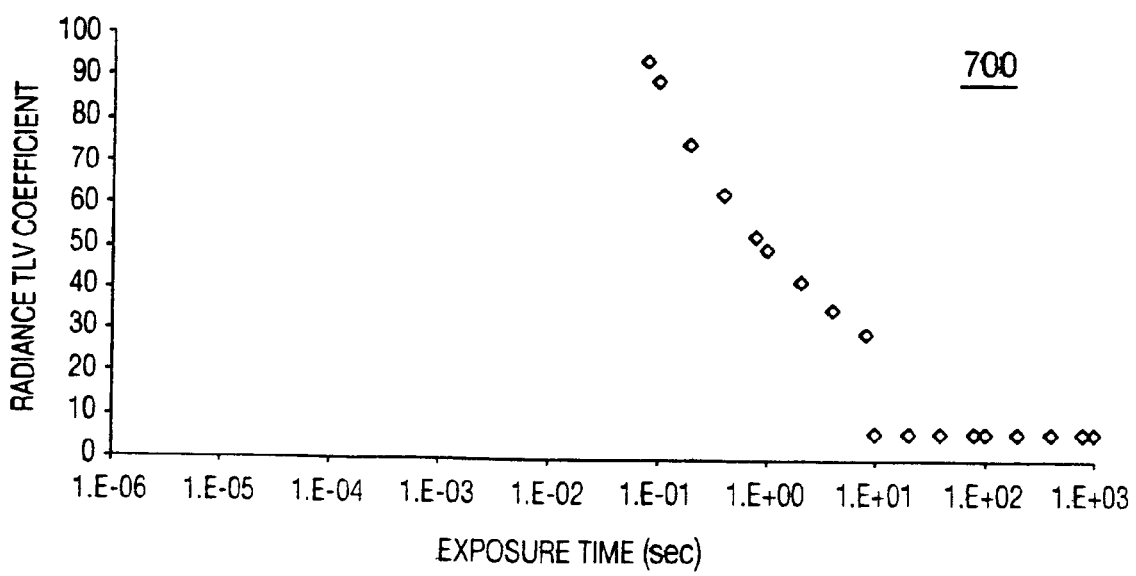

The American Conference of Industrial Hygienists (ACGIH) 2004 handbook for threshold limit values (TLVs) and biological exposure indices (BEIs) recognizes three regimes for retinal injury from visible and near IR radiation: retinal photochemical injury from chronic blue light exposure, retinal thermal injury from visible or near IR exposure, and retinal photochemical injury from chronic blue light exposure in workers with a lens removed and cataract surgery in which the lens is not replaced with a UV absorbing lens (called aphakic hazard). The handbook provides three retinal hazard spectral weighting functions corresponding to these three hazard regimes: $A(\lambda), B(\lambda)$ and $R(\lambda)$ for the aphakic, blue and thermal hazards respectively. These functions are shown in FIG. 5. They are not analytic; they are presented in the handbook as tables. They are based on analysis of empirical data. These functions are used to weigh other functions that depend on exposure time and angular subtense of the source. The other functions are not analytic and cover multiple cases. FIG. 7 provides an assessment of how the three hazards vary with wavelength. The values of the three weighting functions cannot be compared between hazards. The TLV value is set by the product of the weighting function with a hazard-specific function of exposure and subtense.

Figure 6:
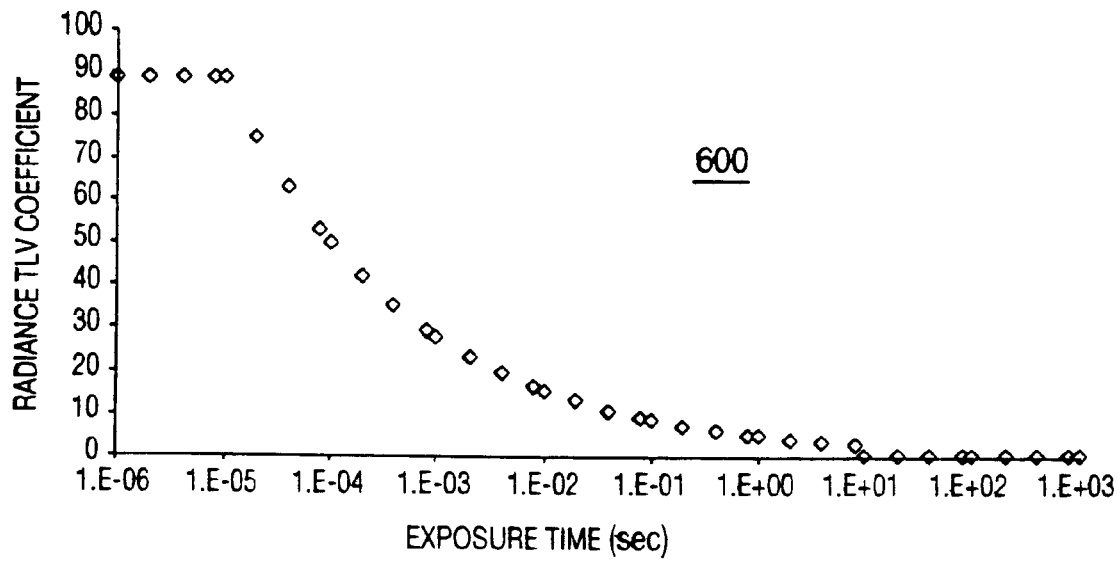
FIGS. 6 and 7 are graphs of exemplary radiance threshold limit value (TLV) coefficient functions.

For the near IR, the TLV for a single wavelength is expressed in the form $$\text{radiance} TLV = f(t)/(R(\lambda)\alpha)$$

Where t is the exposure time, R is the retinal thermal hazard function of FIG. 7, $\alpha$ is the angular subtense of the source as seen by the eye and f(t) is defined as the radiance TLV coefficient, which is a function of exposure time that is presented in FIGS. 6 and 7.

FIGS. 6 and 7 are graphs of exemplary radiance threshold limit value (TLV) coefficient functions 600 and 700. The TLV describes the level of exposure to some hazard (in this case infrared illumination) that is deemed to be the maximum acceptable to avoid risk of injury. This TLV coefficient gives the relative effectiveness of an infra-red illumination dose as a function of the length of time over which that dose is absorbed. The potential for damage is greater when very intense radiation is absorbed over a short period of time than when the same total dose is applied as low intensity radiation over a longer time.

Figure 8:
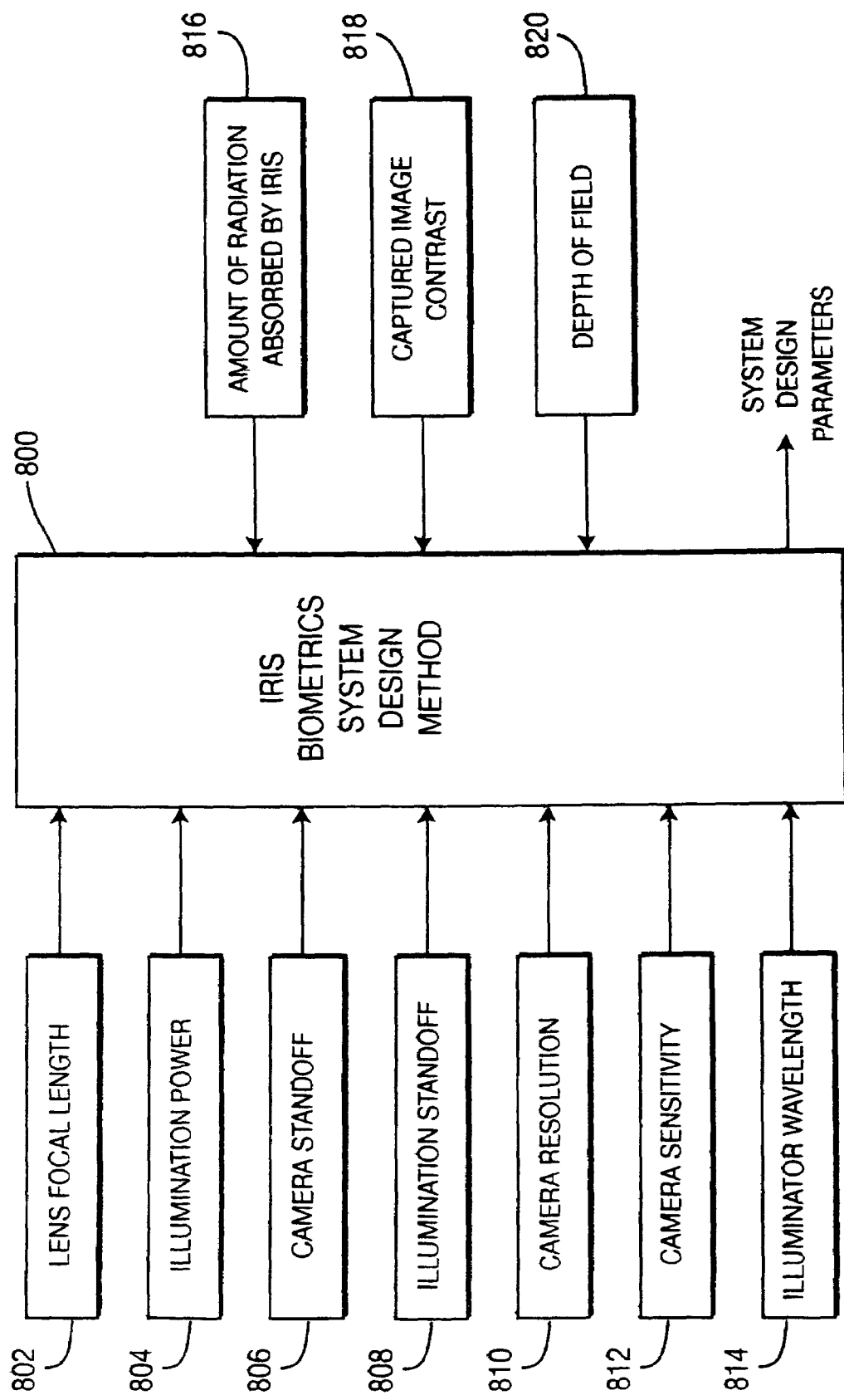
FIG. 8 is a flow diagram showing an exemplary embodiment of a method for providing iris biometrics system design in minimally constrained settings, according to the present invention.

FIG. 8 shows an exemplary embodiment of the present invention of a method 800 for providing iris biometrics system design in minimally constrained settings. The method 800 receives design constraints and provides derived design parameters that are useful in designing a system having a specific set of performance requirements. In this example, the method 800 receives particular values for the following design parameters: a lens focal length 802, an illuminator power 804, a camera standoff 806, an illuminator standoff 808, a camera resolution 810, a camera sensitivity 812, and an illuminator wavelength 814. In response, the method 800 provides an amount of radiation absorbed by the iris 816, a captured image contrast 818, and a depth of field 820. With this provided information, an exemplary embodiment of the present invention of a system can be designed meeting particular performance requirements to perform in a minimally constrained setting. The method 800 may be implemented using the information in FIGS. 9A-E to generate a set of inequality constraints on the system design parameters to be satisfied. One exemplary embodiment of the present invention is a system designed in accordance with method 800 using the information in FIGS. 9A-E. Of course, other exemplary embodiments of the present invention include methods that are not limited by any particular values or selection of system components, parameters, units or formulas, such as those in FIGS. 9A-E.

Figures 9, 9A, 9B, 9C, 9D, 9E:
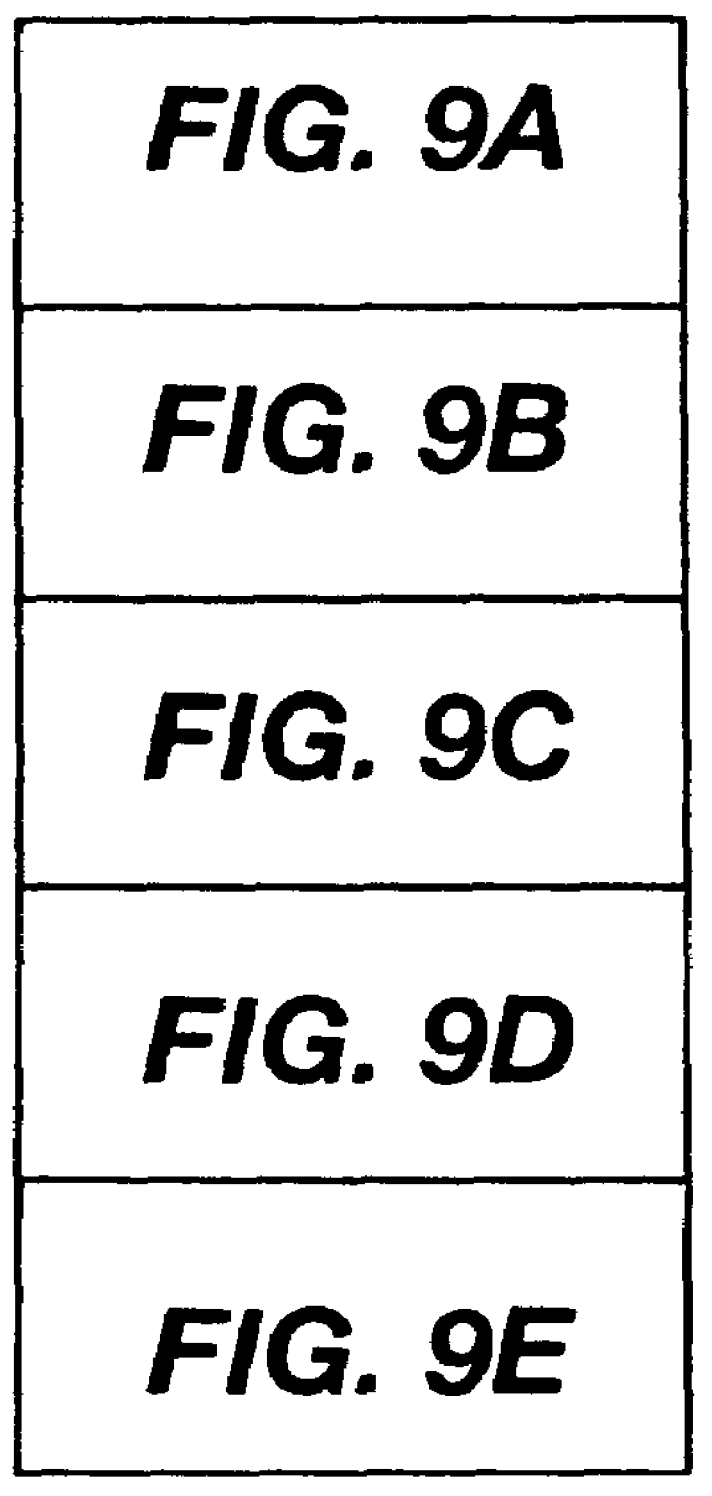

FIG. 9, which includes FIGS. 9A-9E, is a table defining an exemplary iris acquisition model. This model is implemented as a spreadsheet with macros (see Table 6). In this table, for each system component, there are associated parameters which have a sample value, units, symbol, and formula. Values and units are also provided in international system of units (SI). In this exemplary model, the following system components are defined: illumination, illumination standoff, ambient illumination, subject, camera standoff, camera lens, camera sensor, iris image, and constants. Of course, the present invention contemplates various similar models and is not limited to any particular values shown in FIGS. 9A-E.

This exemplary model is implementable as a system design and analysis tool using software, such as a Microsoft® Excel® spreadsheet program. Design parameters (such as lens focal length, illuminator power, camera standoff, illuminator standoff, camera resolution, camera sensitivity, illuminator wavelength, and so forth) are entered and derived quantities are output. The derived quantities may comprise the amount of radiation absorbed by the iris, the captured image contrast, and the depth of field for the particular constraints. This model is capable of generating many different iris biometrics systems based on different combinations of parameters, such as capture volume, camera placement, speed of motion, and other factors.

In designing a system for a specific set of performance parameters (e.g., camera standoff greater than three meters and capture volume greater than x by y by z), the exemplary embodiment of the present invention of the iris acquisition model shown in FIGS. 9A-E uses design principles embodied in that model to generate a set of inequality constraints on the system design parameters to be satisfied. For example, in order to obtain a specified depth of capture volume, the Far Focus Limit—Near Focus Limit must be greater than this specified value. The Near Focus Limit is given by the model as a numerical expression relating Camera Standoff Distance, Hyperfocal Distance, and Focal Length. Hyperfocal Distance in turn is computed in terms of Focal Length, F number, and Circle of Confusion. Each of these quantities is either specified directly or computed from design constraints. Thus, the capture volume is translated into a constraint on system design parameters, allowing engineering tradeoffs to achieve application requirements to be evaluated.

The exemplary iris acquisition model shown in FIGS. 9A-E includes the following model components: controlled illumination, illumination standoff, ambient illumination, subject, camera standoff, camera lens, camera sensor, and iris image. The controlled illumination is the illumination supplied by the iris acquisition system. The illumination standoff is the distance between the controlled illumination and the subject including the properties of the intervening medium. The ambient illumination is the illumination not controlled by the iris acquisition system. The subject is the iris being measured. The camera standoff is the distance between the front of the camera lens and the subject. The camera lens is the optical elements of the camera. The camera sensor is the device that converts photons into electronic signals. The iris image is the output of the sensor.

Table 5 lists exemplary parameters associated with controlled illumination. Wavelength is the wavelength of the illumination source. Radiance is the brightness of the illumination source, the areal density of radian intensity, and the watts/s per unit area of source. Radiance TLV is the threshold limit value of radiance for eye sage operation. It depends on wavelength, exposure time, and angular subtense of the source as seen from the subject's iris and the pulse width and repetition rate if the illumination source is not continuous. The TLV is defined by the ACGIH. In one exemplary embodiment of the present invention, macros in a spreadsheet compute the TLVs. (Table 14 shows exemplary code for these macros.) The area of a single emitter is the area in meters squared of one of an array of emitters. The number of emitters is a number of emitters in an array of emitters. The duty cycle is a function of the time the source is on. The pulse width is the width of pulses for a pulsed source. The repetition rate is the frequency of pulses for a pulsed source. The duration is the duration of exposure, which encompasses multiple pulses for a pulsed source.

TABLE 5

Exemplary Parameters for Controlled Illumination

| Parameter | Input | Symbol | SI Units |
|---|---|---|---|
| Wavelength | X | $\lambda_{source}$ | m |
| Radiance | X | $L_{source}$ | W/m2-sr |
| Radiance TLV | | $I_{TLV}$ | W/m2-sr |
| Area of single emitter | X | $A_{source}$ | m2 |
| Number of Emitters | X | | |
| Radiant Intensity | | $I_{source}$ | W/sr |
| Duty cycle | X | | % |
| Pulse width | | | sec |

TABLE 5-continued

Exemplary Parameters for Controlled Illumination

| Parameter | Input | Symbol | SI Units |
|---|---|---|---|
| Repetition rate | X | | Hz |
| Duration | X | | sec |

Measurement of Radiance

The radiance of an LED is seldom specified by the manufacturer. Hence, for the exemplary iris acquisition model of FIGS. 9A-E, radiance is measured or computed from other parameters. Given a calibrated irradiance meter, the irradiance is measured as a function of distance from the source. By plotting the irradiance vs. the inverse square distance, the slope of the line is the radiant intensity of the source. Radiance is determined using the area of the source. The area of the source is determined by taking a picture of the source with the intensity turned down low enough that it will not bloom the camera. The dimensions of the active area of the LED are scaled off, the active area, and the radiance of the source are computed. In one example, $$L=0.028/1.2E-6=2.3E4(w/m^2-sr)$$

At 20 mA.

Table 6 lists exemplary parameters associated with controlled illumination standoff. Distance is the distance from the source to the iris. Distance/size ratio is the ratio of the source distance to the largest transverse dimension of the source. In one exemplary embodiment of the present invention, values larger than about 10 for the small angle approximations are considered valid in a model, such as the model in FIGS. 9A-E. Angular subtense is the largest subtended angle of the source as seen from the iris. The optical properties of the intervening medium are absorption, refraction, dispersion, and scattering.

TABLE 6

Exemplary Parameters for Controlled Illumination Standoff

| Parameter | Input | Symbol | SI Units |
|---|---|---|---|
| Distance | X | $d_{source}$ | m |
| Distance/size ratio | | | |
| Angular subtense | | | sr |
| Optical properties | X | | |

Table 7 lists exemplary parameters for ambient illumination. The wavelength is the wavelength of the illumination source. The subject irradiance is the irradiance measured at the subject due to ambient illumination.

TABLE 7

Exemplary Parameters for Ambient Illumination

| Parameter | Input | Symbol | SI Units |
|---|---|---|---|
| Wavelength | X | | m |
| Subject irradiance | X | | W/m2 |

Table 8 lists exemplary parameters for the subject. The subject irradiance is the irradiance at the subject due to the controlled illumination source. The irradiance TLV, non laser is the TLV for incoherent, non-laser light, while the irradiance TLV, laser is the TLV for laser light. The iris albedo is the measured average albedo of a prototype iris. The iris albedo root mean square (RMS) is the measured RMS variation of albedo about the average. The skin albedo is the measured average skin albedo. The sclera albedo is the measured average sclera albedo. The pupil albedo is the measured average pupil albedo. The iris diameter is the measured iris diameter of a prototype iris. The iris average excitance is the light reflected from the iris. The iris RMS excitance is the variation in light reflected from the iris.

TABLE 8

Exemplary Parameters for the Subject

| Parameter | Input | Symbol | SI Units |
|---|---|---|---|
| Subject irradiance |  | $E_{subject}$ | W/m2 |
| Irradiance TLV - non-laser |  |  | W/m2 |
| Irradiance TLV - laser |  |  | W/m2 |
| Iris albedo | X |  |  |
| Iris albedo RMS variation | X |  | % |
| Skin albedo | X |  |  |
| Sclera albedo | X |  |  |
| Pupil albedo | X |  |  |
| Iris diameter | X |  | m |
| Iris average excitance |  |  | W/m2 |
| Iris RMS excitance |  |  | W/m2 |

Measurement of Albedo

Iris albedo and variation of iris albedo data in the near IR does not seem to be readily available in the open literature. Hence, iris albedo is measured for the exemplary model. This is done using a reflectance standard, such as the type provided by Labsphere, North Sutton, N.H. or Ocean Optics, Dunedin, Fla. by performing the following method. Arrange a light source to uniformly (i.e., constant irradiance) illuminate the subject iris and a reflectance standard at the desired wavelength. Image the subject and standard with a camera with gamma correction and automatic gain control (AGC) turned off. Adjust the illumination level for pixel values of the standard at approximately 90% of full scale. Capture image(s). Compare pixel values of the iris with that of the standard. If the standard has an albedo of about 1.00, the iris albedo is the ratio of the pixel value on the iris to that on the standard. If the iris albedo is low, capture one image as described above and then increase the illumination level by a known factor and recapture. Rescale the pixel values of the iris in the original image by the illumination level ratio of the two images and proceed to compare those values with the iris pixel values in the new image. A series of images may be taken with increasing intensity to plot the pixel values for the various structures, (e.g., reference, skin, iris, sclera) of interest as a function of the intensity. The data usually fits straight lines. The ratios of the slopes of the iris, sclera, and skin to that of the reference then give the albedos for those structures. The variation of albedo is estimated within a structure by extracting a region of pixels from the structure and computing the average and standard deviation of the pixels.

Table 9 lists the exemplary parameters associated with the camera standoff. The distance is the distance from the front of the camera to the subject iris. The optical properties of the intervening medium are absorption, refraction, dispersion, and scattering.

TABLE 9

Exemplary Parameters for the Camera Standoff

| Parameter | Input | Symbol | SI Units |
|---|---|---|---|
| Distance | X | $d_{camera}$ | m |
| Optical properties of intervening medium | X |  |  |

Table 10 lists the exemplary parameters associated with the camera lens. The magnification is the iris radius at the sensor divided by the iris radius at the subject. The focal length is the distance along the optical axis from the lens to the focus (or focal point). The lens F# is the ratio of the lens focal length to the lens diameter. The transmission is the fraction of light transmitted by the lens. The effective lens diameter is the areas of the lens for light capture. The lens capture efficiency is the fraction of light from the subject that is captured by the lens. The total lens efficiency is the fraction of light from the subject that arrives at the sensor. The circle of confusion (at the sensor) is the maximum diameter of a point source as imaged on the sensor that is below the resolution limit of the sensor. The hyper focal distance is the focus point at which the depth of field extends from half hyper focal distance to infinity. The near focal distance is the near edge of the depth of field. The far focus limit is the far edge of the depth of field. The depth of field is the region of space within which a point is imaged to a circle smaller than the circle of confusion.

TABLE 10

Exemplary Parameters for the Camera Lens

| Parameter | Input | Symbol | SI Units |
|---|---|---|---|
| Magnification |  |  |  |
| Focal length |  | f | m |
| F# | X | F# |  |
| Transmission | X | $T_{lens}$ | % |
| Effective Lens Diameter |  |  | m |
| Lens Capture Efficiency |  |  |  |
| Total Lens Efficiency |  |  |  |
| Circle of confusion (at sensor) |  |  | m |
| Hyper focal distance |  |  | m |
| Near focus limit |  |  | m |
| Far focus limit |  |  | m |
| Depth of field |  |  | m |

Table 11 lists exemplary parameters for the camera sensor. The quantum efficiency is for interacting/incident photons. The camera gain J for interacting photons and the camera gain K for electrons are from the well known photon transfer curve. The well depth is the depth of the sensor well in electrons. The read noise is the noise in the absence of photons. The shot noise is the square root of the sensor average signal. The pixel width is set by the pitch and fill factor. The pixel height is the same as width for square pixels. The pixel pitch horizontal is the pixel spacing, which is not the same as the pixel width. The pixel pitch vertical is the same as width, for square pixels. The pixel area is the pixel width times the pixel height. The fill factor is the size of the light sensitive photodiode relative to the surface of the pixel. The sensor width and height are measured in pixels and meters. The shutter time is the exposure time. Photon energy=Planck's constant*the speed of light/the source wavelength. Sensor average irradiance=iris average excitance*total lens efficiency. Sensor RMS radiance=iris RMS excitance*total lens efficiency. Sensor signal photons=sensor average irradiance*pixel area*camera shutter/photon energy. Sensor average signal=quantum efficiency*sensor signal photons.

Sensor RMS signal=sensor average signal*iris albedo variation. Total sensor noise=read noise+shot noise. Dynamic range fraction=sensor average signal/well depth. Signal/noise=20 log(sensor average signal/total sensor noise). Contrast signal noise=20 log(sensor RMS signal/total sensor noise).

TABLE 11

Exemplary Parameters for the Camera Sensor

| Parameter | Input | Symbol | SI Units |
|---|---|---|---|
| Quantum Efficiency (interacting/incident) photons | X | QE | |
| Camera Gain J (interacting photons) | X | | photon/DN |
| Camera Gain K (electrons) | X | | e-/DN |
| Well depth | X | | e- |
| Read Noise | | | e- |
| Shot Noise | | | e- |
| Pixel width | X | | m |
| Pixel height | | | m |
| Pixel pitch horizontal | | | m |
| Pixel pitch vertical | | | m |
| Pixel Area | | | m2 |
| Fill factor | X | | % |
| Sensor Width, Pixels | X | | |
| Sensor Height, Pixels | X | | |
| Sensor Width | | | m |
| Sensor Height | | | m |
| Shutter time | X | | sec |
| Photon Energy | | | joule |
| Sensor average irradiance | | | W/m2 |
| Sensor RMS irradiance | | | W/m2 |
| Sensor Signal Photons | | | photons |
| Sensor Average Signal | | | e- |
| Sensor RMS Signal | | | e- |
| Total Sensor Noise | | | e- |
| Dynamic Range Fraction | | | |
| Signal/Noise | | | dB |
| Contrast Signal/Noise | | | dB |

Table 12 lists the exemplary parameters for iris image. The pixels across iris is the desired pixel resolution at the subject. The resolution is the resolution at the subject. The contrast is the contrast at the subject. The excess resolution factor is used to determine the optical resolution needed for recognition. The minimum required resolution at the subject is the minimum needed for recognition.

TABLE 12

Exemplary Parameters for the Camera Sensor

| Parameter | Input | Symbol | SI Units |
|---|---|---|---|
| Pixels across iris | X | | |
| Resolution(at subject) | | | pixels/m |
| Contrast | | | |
| Excess Resolution Factor | | | |
| Minimum Required Resolution (at subject) | X | | pixels/m |

Radiometric Physics

The parameters in Table 13 are general optics terms. Using subscripts s for source and t for target, R as the source target distance and $A_s$, and $A_t$ as the target and source respectively, the radiant intensity is related to the radiance and the source area by $$I = L_s A_s$$

for a uniform extended source. A point source is modeled as $L_s \sim 1/A_s$ as $A_s$ goes to zero. The radiant flux incident on a target is the product of the solid angle subtended by the target and the radiant intensity $$\phi_t = I*(4\pi A_t/4\pi R^2) = I*(A_t/R^2).$$

The target irradiance is the ratio of the radian flux to the target area $$E_t \phi_t / A_t = I/R^2 = L_s A_s / R^2$$

The albedo of a surface is the ratio of its radiant exitance to its irradiance. For an extended source of radiance $L_s$, which has a size large enough to fill the viewing angle, $\theta$, of a detector, the measured irradiance is given by $$E = \pi L \sin^2(\theta/2)$$

independent of distance. Conceptually, as the distance increases, the detector sees more of the source and the increased source visibility balances the $1/r^2$ falloff from each area element, dA.

TABLE 13

Some general optics terms

| Parameter | Symbol | Units | Use to measure |
|---|---|---|---|
| radiant energy | Q | Joule | |
| radiant power | ø | Joule/sec Watt | |
| radiance | L | W/m2-sr | source brightness |
| radiant intensity | I | W/sr | light flux propagating in space |
| irradiance | E | W/m2 | light flux density impinging on a surface |
| radiant exitance | M | W/m2 | light flux density emitted from a surface |
| albedo | | | reflectance of a surface |

Relationship between Retinal Irradiance, Corneal Irradiance, Source Radiance, and Retinal Hazards For corneal and lens damage to the eye, the deposition of energy to the cornea depends on the corneal irradiance $E_c$. For retinal damage, the deposition of energy in the retina depends on the retinal irradiance, $E_r$. In many cases, the corneal irradiance tells little about the retinal irradiance, because the corneal irradiance is focused onto the retina and the details of the focused image depend on the source, rather than the corneal irradiance. The retinal irradiance is given by $$E_r = L_s \tau / f_e^2$$

where $f_e$ is the focal length of the eye lens and $\tau$ is the transmission of the lens and the intraocular fluids. Because $\tau$ and $f_e$ are reasonably constant across the population, the eye safety limits are expressed in terms of the source radiance. There are complicating factors. The size of the image on the retina has an impact on the rate at which energy is diffused from the image and this interacts with the exposure time so that the maximum permissible source radiance for safety depends on the angular subtense of the source, the source wavelength, and the duration of the exposure. For sources that are effectively very far away so that the light impinging on the eye is essentially plane waves (e.g., laser light) or for true point sources, the size of the image on the retina is determined by diffraction and aberration in the eye, rather than by the size of the source. In these cases, the corneal irradiance is a better indicator of retinal irradiance than the source radiance. These relationships have been used to develop eye safety standards for corneal/lens and retinal damage.

TABLE 14

Exemplary TLV Macros

```
' TLV Macros
Private Const CM2perM2 = 10000          ' cm^2 per m^2 conversion factor
Option Explicit
'
Public Function OccularRadianceTLV(ByVal exposureTimeSec As Single, _
                ByVal wavelengthNM As Single, _
                ByVal angularSubtense As Single) As Single
    ' returns watts/sr-m^2
    ' from ACGIH 2004 TLVs and BEIs, page 154. Get a copy at www.acgih.org
    Dim myTLV As Single
    myTLV = 0 ' default in case where we do not know it or have not calculated it
    If (exposureTimeSec < 0.00001) Then exposureTimeSec = 0.00001
    If (wavelengthNM >= 770) And (wavelengthNM <= 1400) Then
        If (exposureTimeSec >= 10) Then
            myTLV = 0.6 / (angularSubtense * retinalThermalHazardMultiplier(wavelengthNM)) ' page 154 section 4b
        Else
            myTLV = 5 / (retinalThermalHazardMultiplier(wavelengthNM) * angularSubtense * exposureTimeSec ^ 0.25)
        End If
    End If
    OccularRadianceTLV = CM2perM2 * myTLV
End Function
'
Public Function OccularIrradianceTLV(exposureTimeSec As Single, wavelengthNM As Single) As Single
    ' returns watts/m^2
    ' from ACGIH 2004 TLVs and BEIs, page 154. Get a copy at www.acgih.org
    Dim myTLV As Single
    myTLV = 0 ' default in case where we do not know it or have not calculated it
    If (wavelengthNM >= 770) And (wavelengthNM <= 3000) Then
        If (exposureTimeSec >= 1000) Then
            myTLV = 0.01 * CM2perM2         ' page 154 section 4a
        Else
            myTLV = 1.8 * exposureTimeSec ^ (-3 / 4) * CM2perM2 'page 154 section 4a
        End If
    Else
    End If
    OccularIrradianceTLV = myTLV
End Function
Public Function LaserOccularIrradianceTLV(exposureTimeSec As Single, wavelengthNM As Single) As Single
    ' returns watts/m^2
    ' from ACGIH 2004 TLVs and BEIs, page 137. Get a copy at www.acgih.org
    Dim myTLV As Single
    myTLV = 0 ' default in case where we do not know it or have not calculated it
    If (wavelengthNM < 700) Or (wavelengthNM > 1000000#) Then
    ' not yet implemented
    End If
    If (wavelengthNM >= 700) And (wavelengthNM <= 1400) Then
            '     700 nm to 1400 microns -- IRA
        If (exposureTimeSec > 30000#) Then 'not yet implemented
        End If
        If (exposureTimeSec >= 1000) And (exposureTimeSec <= 30000#) Then
            myTLV = 320 * Ca(wavelengthNM) * Cc(wavelengthNM) ' microwatts/cm^2
            myTLV = 0.000001 * CM2perM2 * myTLV ' W/m^2
        End If
        If (exposureTimeSec < 1000) Then
            If (wavelengthNM >= 700) And (wavelengthNM < 1050) And _
                    (exposureTimeSec >= 0.0000000000001) And
                    (exposureTimeSec < 0.00000000001) Then
                myTLV = 1.5 * Ca(wavelengthNM) * 0.00000001 / exposureTimeSec
                myTLV = myTLV * CM2perM2 ' W/m^2
                ' 1.5 Ca 1e-8 J/cm^2
            End If
            If (wavelengthNM >= 700) And (wavelengthNM < 1050) And _
                    (exposureTimeSec >= 0.00000000001) And (exposureTimeSec < 0.000000001) Then
                myTLV = 2.7 * Ca(wavelengthNM) / exposureTimeSec ^ 0.25
                myTLV = myTLV * CM2perM2   ' W/m^2
                ' 2.7 Ca t/t^0.25 J/cm^2
            End If
            If (wavelengthNM >= 700) And (wavelengthNM < 1050) And _
                    (exposureTimeSec >= 0.000000001) And (exposureTimeSec < 0.000018) Then
                myTLV = 5 * Ca(wavelengthNM) * 0.0000001 / exposureTimeSec
                myTLV = myTLV * CM2perM2 ' W/m^2
                ' 5 Ca   1e-7 J/cm^2
            End If
            If (wavelengthNM >= 700) And (wavelengthNM < 1050) And _
                    (exposureTimeSec >= 0.000018) And (exposureTimeSec < 1000) Then
                myTLV = 1.8 * Ca(wavelengthNM) / exposureTimeSec ^ 0.25
                myTLV = myTLV * CM2perM2 * 0.001 ' W/m^2
                ' 1.8 Ca   (t/t^0.25) mJ/cm^2
            End If
            If (wavelengthNM >= 1050) And (wavelengthNM <= 1400) And _
                    (exposureTimeSec >= 0.0000000000001) And (exposureTimeSec < 0.00000000001) Then
                myTLV = 1.5 * Cc(wavelengthNM) * 0.0000001 / exposureTimeSec
                myTLV = myTLV * CM2perM2 ' W/m^2
                ' 1.5 Cc 1e-7 J/cm^2
            End If
            If (wavelengthNM >= 1050) And (wavelengthNM <= 1400) And _
                    (exposureTimeSec >= 0.00000000001) And (exposureTimeSec < 0.000000001) Then
                myTLV = 2.7 * Cc(wavelengthNM) / exposureTimeSec ^ 0.25
                myTLV = myTLV * CM2perM2 ' W/m^2
                ' 2.7 Cc (t/t^0.25) J/cm^2
            End If
            If (wavelengthNM >= 1050) And (wavelengthNM <= 1400) And _
                    (exposureTimeSec >= 0.000000001) And (exposureTimeSec < 0.00001) Then
                myTLV = 5 * Cc(wavelengthNM) * 0.000001 / exposureTimeSec
                myTLV = myTLV * CM2perM2 ' W/m^2
                ' 5 Cc 1E-6 J/cm^2
            End If
            If (wavelengthNM >= 1050) And (wavelengthNM <= 1400) And _
                    (exposureTimeSec >= 0.00001) And (exposureTimeSec < 1000) Then
                myTLV = 9 * Cc(wavelengthNM) / exposureTimeSec ^ 0.25
                myTLV = myTLV * CM2perM2 * 0.001 ' W/m^2
                ' 9 Cc t/t^0.25 mJ/cm^2
            End If
        End If
    End If
    If (wavelengthNM > 1400) And (wavelengthNM <= 1000000#) Then
            '   1400 nm to 1000 microns -- IRB & IRC
        If (exposureTimeSec > 30000#) Then 'not yet implemented
```

TABLE 14-continued

Exemplary TLV Macros

```
        End If
        If (exposureTimeSec >= 10) And (exposureTimeSec <=
30000#) Then
            myTLV = 0.1 * CM2perM2 'W/m^2   0.1 W/cm^2 ~ 100
mW/cm^2
        End If
        If (exposureTimeSec < 10) Then
            If (wavelengthNM > 1400) And (wavelengthNM <=
1500) And _
                (exposureTimeSec > 0.00000000000001) And
(exposureTimeSec < 0.001) Then
                myTLV = (0.1 / exposureTimeSec) * CM2perM2 '
W/m^2  0.1 J/cm^2
            End If
            If (wavelengthNM > 1400) And (wavelengthNM <=
1500) And _
                (exposureTimeSec >= 0.001) And
(exposureTimeSec < 10) Then
                myTLV = (0.56 * exposureTimeSec ^ 0.25 /
exposureTimeSec) * CM2perM2 'W/m^2
                ' 0.56 * t^0.25 J/cm^2
            End If
            If (wavelengthNM > 1500) And (wavelengthNM <=
1800) And _
                (exposureTimeSec >= 0.00000000000001) And
(exposureTimeSec < 10) Then
                myTLV = (1 / exposureTimeSec) * CM2perM2 '
W/m^2
                ' 1 J/cm^2
            End If
            If (wavelengthNM > 1800) And (wavelengthNM <=
2600) And _
                (exposureTimeSec >= 0.00000000000001) And
(exposureTimeSec < 0.001) Then
                myTLV = (0.1 / exposureTimeSec) * CM2perM2 '
W/m^2
                ' 0.1 J/cm^2
            End If
            If (wavelengthNM > 1800) And (wavelengthNM <=
2600) And _
                (exposureTimeSec >= 0.001) And
(exposureTimeSec < 10) Then
                myTLV = (0.56 * exposureTimeSec ^ 0.25 /
exposureTimeSec) * CM2perM2 'W/m^2
                ' 0.56 * t^0.25 J/cm^2
            End If
            If (wavelengthNM > 2600) And (wavelengthNM <=
1000000#) And _
                (exposureTimeSec >= 0.00000000000001) And
(exposureTimeSec < 10000000#) Then
                myTLV = (0.01 / exposureTimeSec) * CM2perM2 '
W/m^2
                ' 0.01 J/cm^2
            End If
            If (wavelengthNM > 2600) And (wavelengthNM <=
1000000#) And _
                (exposureTimeSec >= 0.0000001) And
(exposureTimeSec < 10000000#) Then
                myTLV = (0.56 * exposureTimeSec ^ 0.25 /
exposureTimeSec) * CM2perM2 'W/m^2
                ' 0.56 * t^0.25 J/cm^2
            End If
        End If
    End If
    LaserOccularIrradianceTLV = myTLV
End Function
Public Function alphaMin(exposureTimeSec As Single) As Single
    ' returns radians
    ' from ACGIH 2004 TLVs and BEIs, page 133.  Get a copy at
www.acgih.org
    Dim a As Single
    a = 0
    If exposureTimeSec <= 0.7 Then a = 0.0015
    If (exposureTimeSec > 0.7) And (exposureTimeSec <= 10)
Then
        a = 0.002 * exposureTimeSec ^ 0.75
```

TABLE 14-continued

Exemplary TLV Macros

```
    End If
    If exposureTimeSec > 10 Then a = 0.011
    alphaMin = a
End Function
Private Function Ca(wavelengthNM As Single) As Single
    Dim myCa As Single
    myCa = 0
    If (wavelengthNM < 700) Then ' out of range
    End If
    If (wavelengthNM > 1400) Then ' out of range
    End If
    If (wavelengthNM >= 700) And (wavelengthNM < 1050) Then
        myCa = 10 ^ (0.002 * (wavelengthNM − 700))
    End If
    If (wavelengthNM >= 1050) And (wavelengthNM <= 1400) Then
        myCa = 5
    End If
    Ca = myCa
End Function
Private Function Cc(wavelengthNM As Single) As Single
    Dim myCc As Single
    myCc = 0
    If (wavelengthNM < 700) Then ' out of range
    End If
    If (wavelengthNM >= 700) And (wavelengthNM <= 1150) Then
        myCc = 1
    If (wavelengthNM > 1150) And (wavelengthNM < 1200) Then
        myCc = 10 ^ (0.0181 * (wavelengthNM − 1150))
    End If
    If (wavelengthNM >= 1200) And (wavelengthNM <= 1400) Then
        myCc = 8
    Cc = myCc
End Function
Public Function Ce(exposureTimeSec As Single, alphaRadians As
Single, wavelengthNM As Single) As Single
    ' returns dimensionless
    ' from ACGIH   2004 TLVs and BEIs, page 138.  Get a copy at
www.acgih.org
    Dim aMin As Single
    Dim c As Single
    aMin = alphaMin(exposureTimeSec)
    c = 1
    If (wavelengthNM >= 400) And (wavelengthNM <= 1400) Then
        If alphaRadians <= aMin Then c = 1#
        If (aMin < alphaRadians) And (alphaRadians <= 0.1)
Then c = alphaRadians / aMin
        If (0.1 < alphaRadians) Then c = alphaRadians ^ 2 /
(aMin * 0.1)
        ' This is not exactly what the book shows.  I have
used what I believe to be the
        ' correct result -- I believe the book has an error.
JRM
    End If
    Ce = c
End Function
Public Function retinalThermalHazardMultiplier(wavelengthNM As
Single) As Single
    ' returns dimensionless
    ' from ACGIH   2004 TLVs and BEIs, page 153.  Get a copy at
www.acgih.org
    Dim myValue As Single
    myValue = 10 ' set value at maximum to start
    If (wavelengthNM >= 500) And (wavelengthNM < 700) Then
        myValue = 1
    If (wavelengthNM >= 700) And (wavelengthNM < 1050) Then
        myValue = 10 ^ ((700 − wavelengthNM) / 500)
    If (wavelengthNM >= 1050) And (wavelengthNM < 1400) Then
        myValue = 0.2
    If ((wavelengthNM >= 385) And (wavelengthNM < 390)) Then
        myValue = 0.125
    If ((wavelengthNM >= 390) And (wavelengthNM < 395)) Then
        myValue = 0.25
    If ((wavelengthNM >= 395) And (wavelengthNM < 400)) Then
        myValue = 0.5
    If ((wavelengthNM >= 400) And (wavelengthNM < 405)) Then
        myValue = 1
```

TABLE 14-continued

Exemplary TLV Macros

Figure 10:
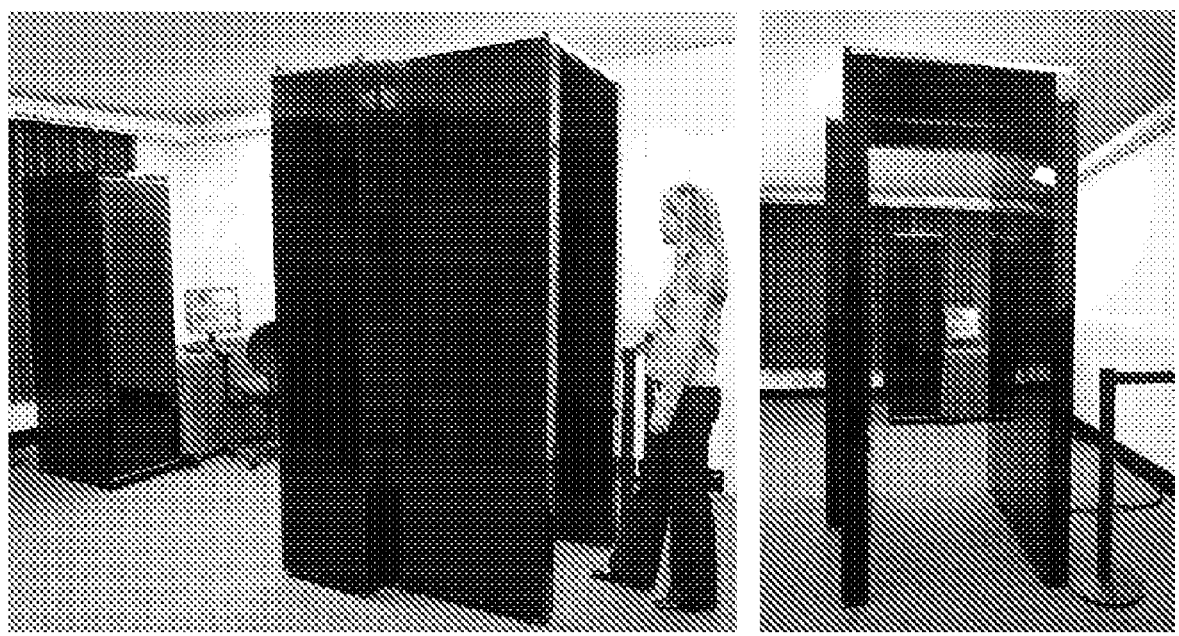
FIG. 10 depicts a portal configuration in accordance with embodiments of the invention.
Figure 11A:
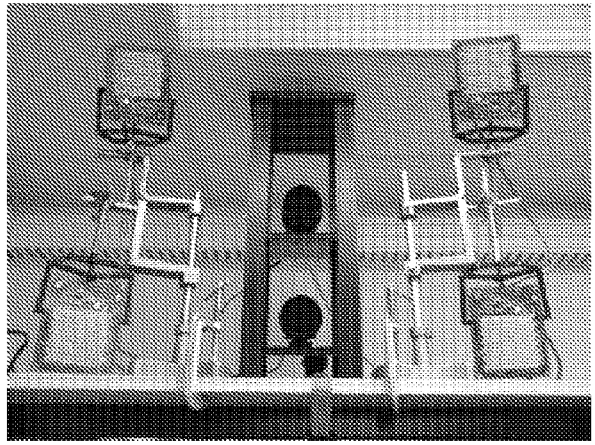
FIGS. 11A-11H depict various views of an over-the-doorway configuration, in accordance with embodiments of the invention.
Figure 11B:
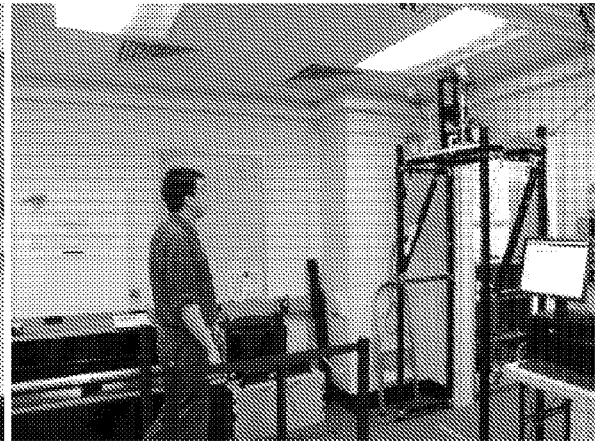
Figure 11C:
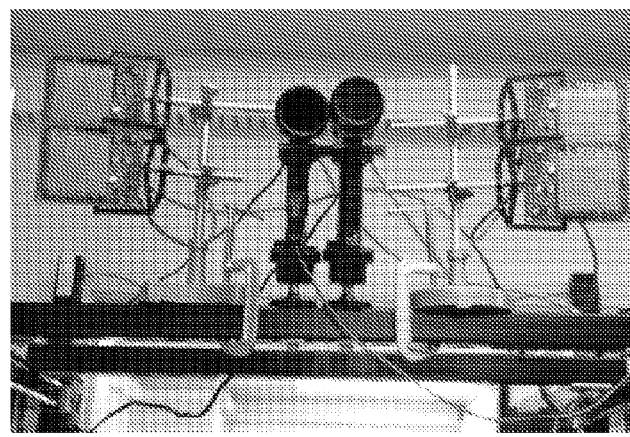
Figure 11D:
Figure 11E:
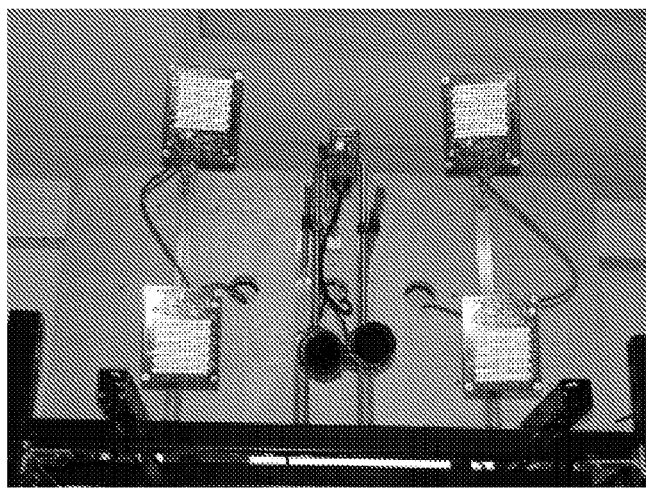
Figure 11F:
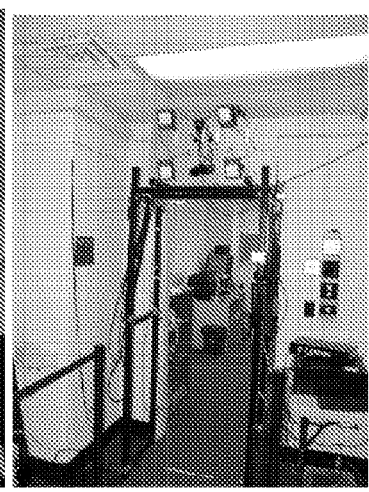
Figure 11G:
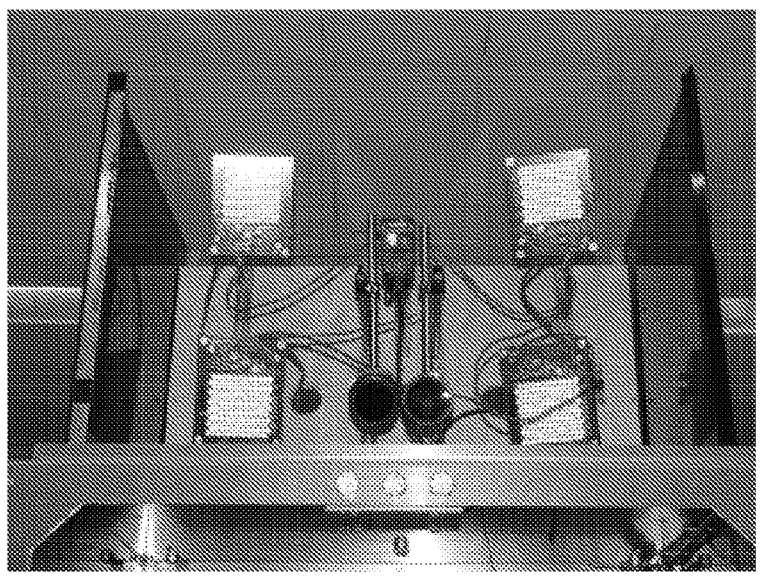
Figure 11H:

If ((wavelengthNM >= 405) And (wavelengthNM < 410)) Then
myValue = 2
If ((wavelengthNM >= 410) And (wavelengthNM < 415)) Then
myValue = 4
If ((wavelengthNM >= 415) And (wavelengthNM < 420)) Then
myValue = 8
If ((wavelengthNM >= 420) And (wavelengthNM < 425)) Then
myValue = 9
If ((wavelengthNM >= 425) And (wavelengthNM < 430)) Then
myValue = 9.5
If ((wavelengthNM >= 430) And (wavelengthNM < 435)) Then
myValue = 9.8
If ((wavelengthNM >= 435) And (wavelengthNM < 440)) Then
myValue = 10
If ((wavelengthNM >= 440) And (wavelengthNM < 445)) Then
myValue = 10
If ((wavelengthNM >= 445) And (wavelengthNM < 450)) Then
myValue = 9.7
If ((wavelengthNM >= 450) And (wavelengthNM < 455)) Then
myValue = 9.4
If ((wavelengthNM >= 455) And (wavelengthNM < 460)) Then
myValue = 9
If ((wavelengthNM >= 460) And (wavelengthNM < 465)) Then
myValue = 8
If ((wavelengthNM >= 465) And (wavelengthNM < 470)) Then
myValue = 7
If ((wavelengthNM >= 470) And (wavelengthNM < 475)) Then
myValue = 6.2
If ((wavelengthNM >= 475) And (wavelengthNM < 480)) Then
myValue = 5.5
If ((wavelengthNM >= 480) And (wavelengthNM < 485)) Then
myValue = 4.5
If ((wavelengthNM >= 485) And (wavelengthNM < 490)) Then
myValue = 4
If ((wavelengthNM >= 490) And (wavelengthNM < 495)) Then
myValue = 2.2
If ((wavelengthNM >= 495) And (wavelengthNM < 500)) Then
myValue = 1.6
retinalThermalHazardMultiplier = myValue
End Function Some embodiments of the above-described system are composed of a portal that a subject walks through, and a large rack placed at some distance, such as, by way of non-limiting example, 1.7 meters from the portal exit. Other distances may also be used, as would be known to one of skill in the art, as informed by the present disclosure. As the subject walks through the portal, he or she is instructed to look straight ahead—at which point the subject is identified. The subject must then walk either left or right to exit the system. This configuration is good as a stand-alone identification system that allows high throughput. The system is movable and can be quickly setup to control access to an area. Such a system is shown in FIG. 10, which depicts a portal configuration in accordance with embodiments of the invention.

In alternative embodiments, a new system can be configured in which the illumination devices and cameras are positioned above a doorway—controlling access to a door or turnstile, allowing the subject to continue walking straight ahead after being identified. In such embodiments, the cameras and illumination devices are positioned in substantially the same plane. In such embodiments, the cameras and illumination devices can be focused at a distance of, by way of non-limiting example, 160 cm to the subject. Other focus distances can be selected, as would be understood by one of skill in the art, as informed by the present disclosure. One such embodiment is shown in FIGS. 11A-11H, which depict various views of an over-the-doorway configuration, in accordance with embodiments of the invention;

This embodiment is a modification of the above-described embodiments, but uses a different hardware complement.

While one embodiment of the above-described system includes, by way of non-limiting example, eight NIR illuminators and sensors to detect when a subject enters and leaves; and four cameras with 210 mm (or other dimensions of) lenses, as well as power supplies, controller board, and computer.

In contrast, an embodiment of the over-the door system configuration can contain four NIR illuminators placed next to two cameras with 105 mm (or other dimensions of) lenses. To detect when a subject enters and leaves the system, a sensor uses diffuse reflection points through the capture volume. This acts as a perpendicular beam toward the subject that will be broken as the subject walks toward the system. An ultrasonic motion detector and retro reflector are being considered.

As described below in Table 15, various parameter values differ between above-described portal embodiments, and embodiments having an over-the-door configuration.

TABLE 15

Portal and Doorway System Comparison

|  | Portal | Doorway |
| --- | --- | --- |
| Illuminators | [8] × S144 Illuminators | [4] × S144 Illuminators |
| Cameras | [4] × 210 mm Pulnix 2048 × 2048 @F/16 | [2] × 105 mm Pulnix 2048 × 2048 @F/8 |
| Power Supplies | [2] | [1] |
| Frame Grabber Board | [2] Matrox Helios | [1] Matrox Helios |
| Camera Standoff (Line of Sight) | 279 cm | 160 cm |
| Capture Volume (H × W × DOF) | 60 cm × 20 cm × 36 cm | 33 cm × 25 cm × 12 cm |
| Height Requirements | 4 ft 10 in-6 ft 8 in | 5 ft 6 in-6 ft 7 in |
| Pixels Across Iris | 130 | 112 |
| Avg # of IDs @ 1 m/s | 8.45 | 5.47 |
| Avg HD | 0.1878 ± 0.0254 | 0.1744 ± 0.0469 |
| Minimum HD | 0.1299 | 0.0868 |

Figure 12:
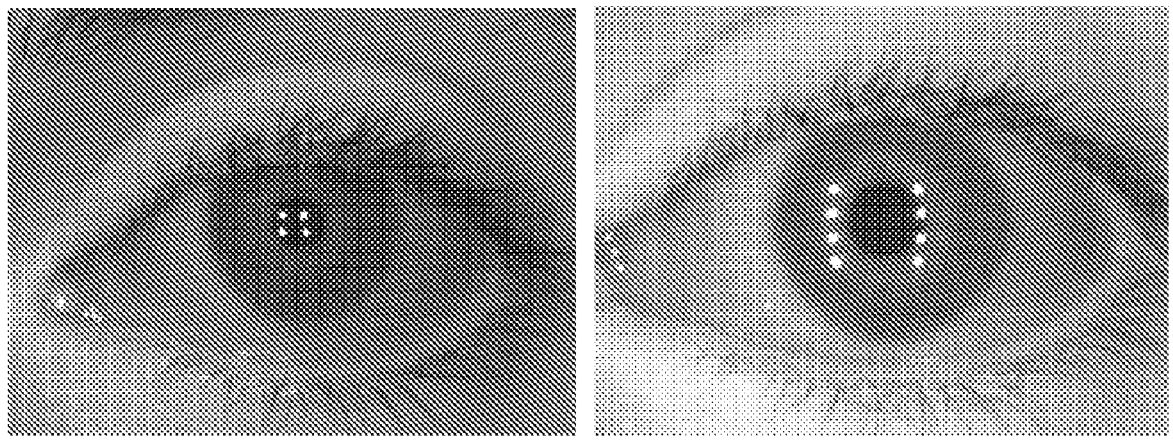
FIG. 12 depicts specularity and iris diameter of doorway (L) and portal (R) systems.
Figure 13:
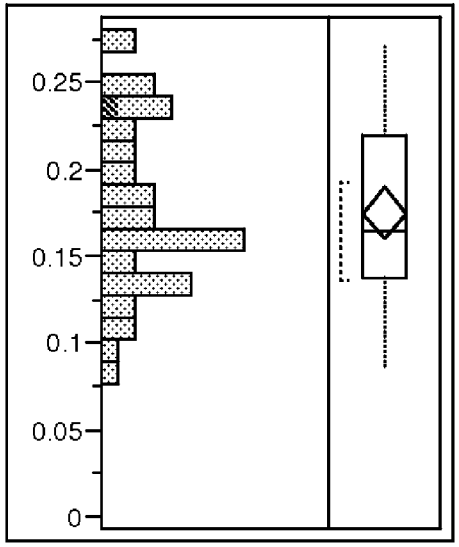
FIG. 13 is an HD histogram of doorway (L) and portal (R) systems.
Figure 13:
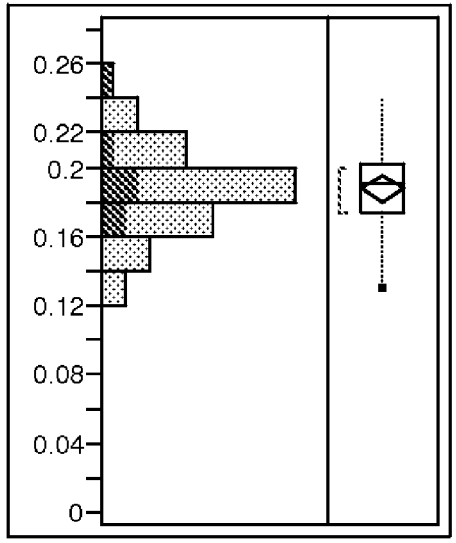

These differences affect performance. The iris images that are captured in the portal system can have, for example, 130 pixels across the iris. The doorway system can have, for example, 112 pixels. Thus, the positions of the illuminators move the specularities to the pupil in the door system. The repositioning of the specularities exposes more of the iris, but can create more of a problem when the subject is wearing glasses, because larger specularities on the glasses may cover the iris. These differences in performance are shown in FIG. 12, which depicts specularity and iris diameter of doorway (L) and portal (R) systems, and FIG. 13 is an HD histogram of doorway (L) and portal (R) systems.

Figure 14:
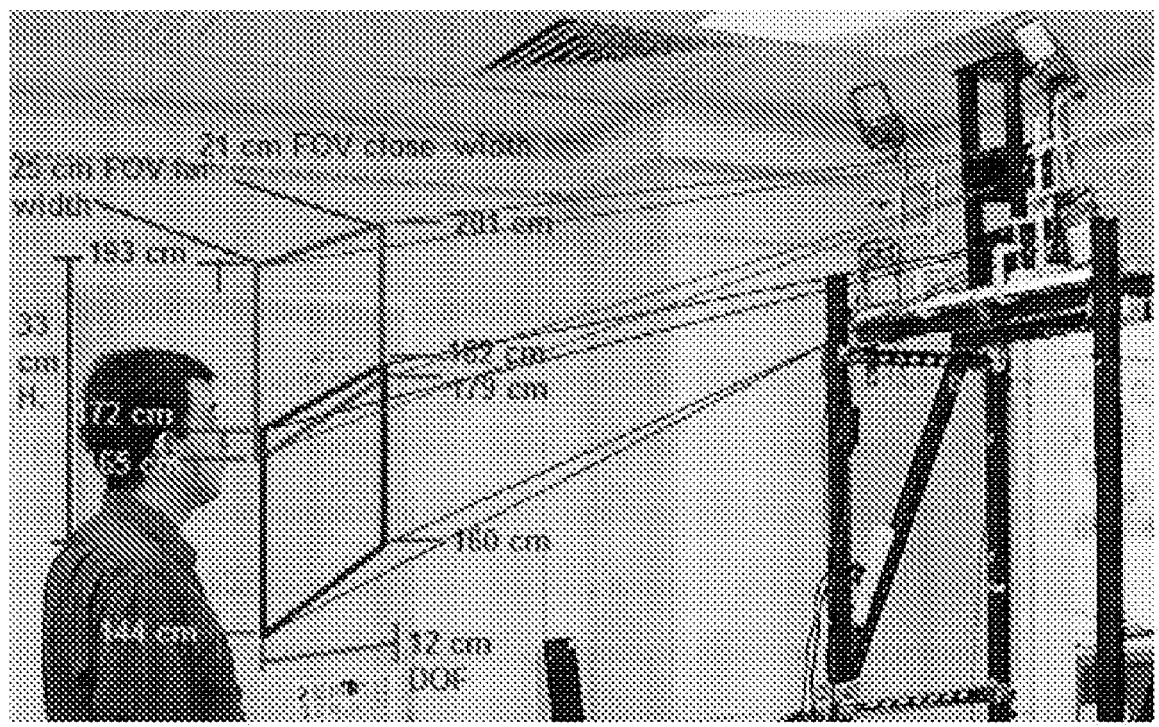
FIG. 14 illustrates an exemplary capture volume in accordance with embodiments of the invention.
Figure 15:
FIG. 15 depicts a field of view (FOV) for a doorway (L) and a portal (R) system configurations.
Figure 16:
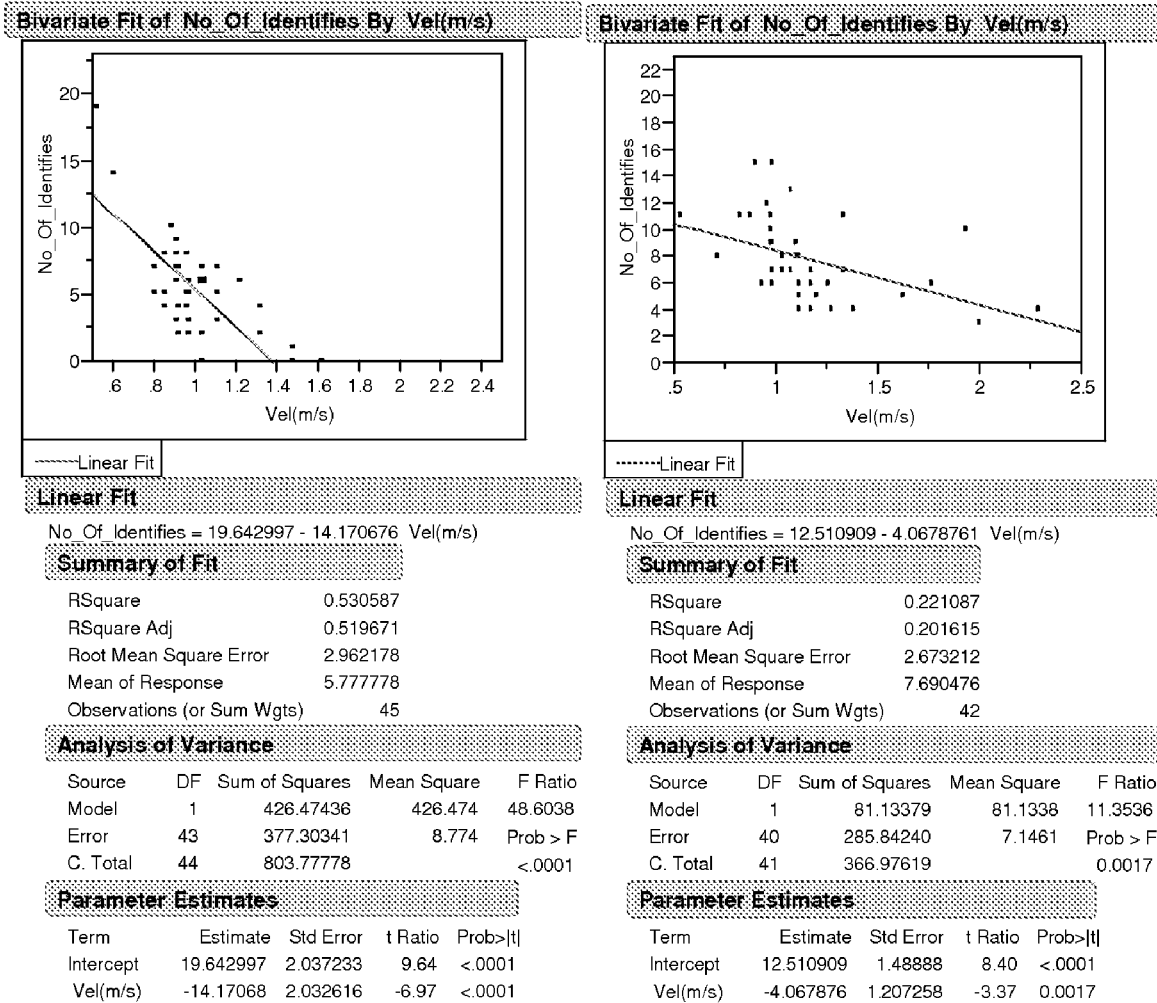
FIG. 16 depicts the number of Identifies vs. subject velocity of doorway (L) and portal (R) system configurations.

Changing the lenses from 210 mm to 105 mm, placing the illuminators on the same plane of the cameras, and changing the F-stop from F/16 to F/8, decreases the DOF from 36 cm to 12 cm. The angle of the cameras also creates regions on the top and bottom of the capture volume where the subject will move out of the field of view as they approach the doorway. FIG. 14 illustrates an exemplary capture volume in accordance with embodiments of the invention FIG. 15 depicts a field of view (FOV) for a doorway (L) and a portal (R) system configurations The smaller depth of field (DOF) reduces the maximum speed a subject can walk through the system, and reduces the number of images obtainable at the normal walking pace of 1 m/s. FIG. 16 depicts the number of Identifies vs. subject velocity of doorway (L) and portal (R) system configurations.

Figure 17:
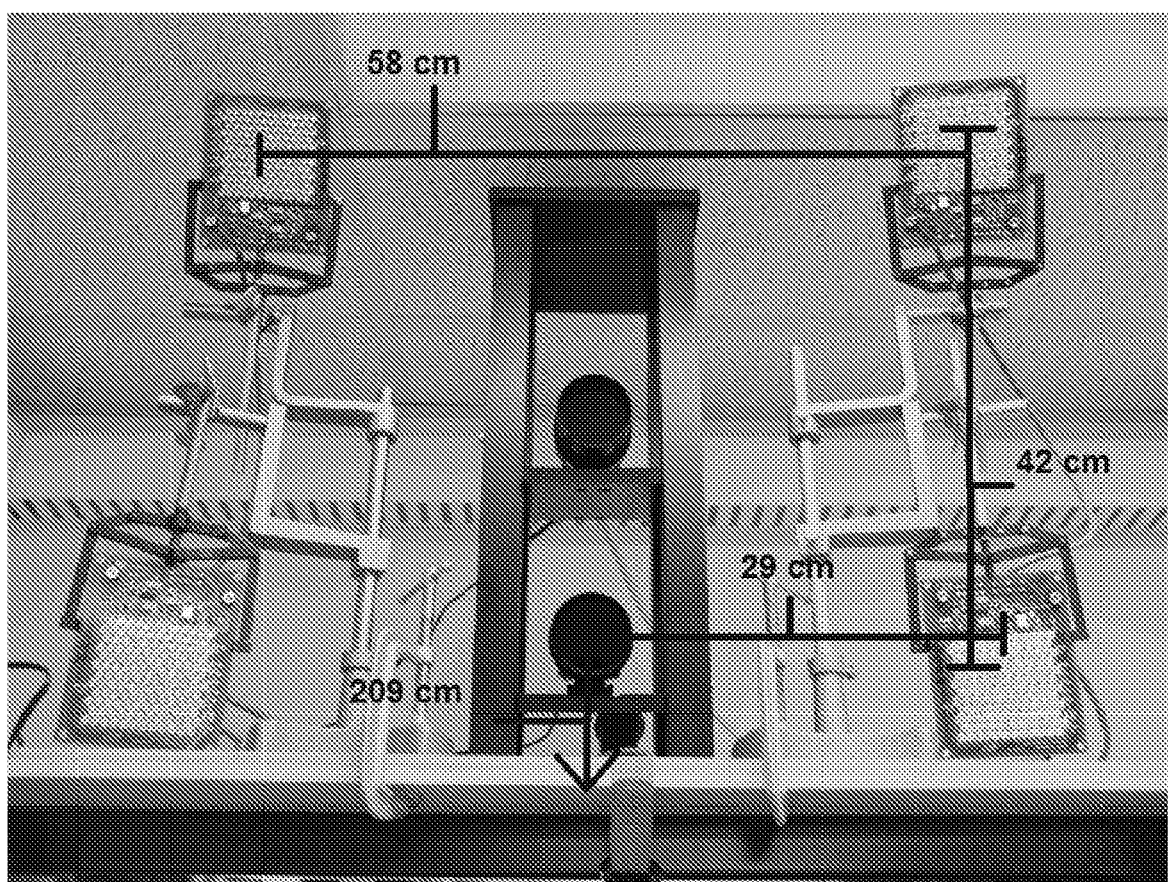
FIG. 17 depicts exemplary dimensions of an over-the-doorway system in accordance with embodiments of the invention.

FIG. 17 depicts exemplary dimensions of an over-the-doorway system in accordance with embodiments of the invention.

Thus, in such embodiments, cameras and illuminators are beneficially positioned in the same plane, above a door. Such embodiments can provide Identification while a subject is moving, with access granted or denied to a door or turnstile.

As described above, a benefit of placing an iris capture system above a door is achieved by advantageous collocation of cameras and illuminator components within a space that is limited in height, width, and depth to a reasonable and practical region above the doorway. This spatial restriction creates difficulties for the some embodiments with respect to illuminator field of view and illuminator-generated specular reflections that mask iris structure. The above-described aver-the-door embodiments beneficially overcomes these problems and therefore enable new and beneficial functional characteristics and applications for the iris recognition system.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. A computerized method for designing an iris biometrics system, comprising:
   receiving, at a user interface, a plurality of design constraints for a minimally constrained environment related to a doorway;
   calculating, by a processor, at least one calculated parameter; and
   providing, by the processor, a design for an iris biometrics system that operates within the plurality of design constraints, the design being based on the at least one calculated parameter; and
   displaying the design at the user interface;
   wherein the iris biometrics system includes a plurality of illuminators, and a plurality of cameras, and the design includes positioning the illuminators and cameras in substantially the same plane.

2. An doorway iris biometric system produced by the method of claim 1.

3. The method of claim 1, wherein the illuminators and cameras are positioned in substantially the same plane as the doorway.

4. The method of claim 1, wherein the illuminators and cameras are positioned over the doorway.

5. The method of claim 1, wherein the illuminators and cameras are positioned above the doorway in substantially the same plane as the doorway.

6. The method of claim 1, wherein the at least one calculated parameter comprises a camera standoff distance.

7. The method of claim 1, wherein the at least one calculated parameter includes a height requirement.

8. A system for designing an iris biometrics system, comprising:
   a user interface for receiving a plurality of design constraints for a minimally constrained environment related to a doorway;
   a processor for calculating at least one calculated parameter and for providing a design for an iris biometrics system that operates within the plurality of design constraints, the design being based on the at least one calculated parameter; and
   wherein the iris biometrics system includes a plurality of illuminators, and a plurality of cameras, and the design includes positioning the illuminators and cameras in substantially the same plane.

9. The system of claim 8, wherein the illuminators and cameras are positioned in substantially the same plane as the doorway.

10. The system of claim 8, wherein the illuminators and cameras are positioned over the doorway.

11. The system of claim 8, wherein the illuminators and cameras are positioned above the doorway in substantially the same plane as the doorway.

12. The system of claim 8, wherein the at least one calculated parameter comprises a camera standoff distance.

13. The system of claim 8, wherein the at least one calculated parameter includes a height requirement.

* * * * *